United States Patent
Bagge et al.

(10) Patent No.: US 8,447,252 B2
(45) Date of Patent: May 21, 2013

(54) ADAPTIVE CHANNEL SCANNING FOR DETECTION AND CLASSIFICATION OF RF SIGNALS

(75) Inventors: Nils Bagge, Austin, TX (US); Ben Jones, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 1102 days.

(21) Appl. No.: 12/357,307

(22) Filed: Jan. 21, 2009

(65) Prior Publication Data
US 2010/0184395 A1    Jul. 22, 2010

(51) Int. Cl.
*H04B 1/18*    (2006.01)

(52) U.S. Cl.
USPC .............. 455/161.1; 455/150.1; 455/160.1; 455/166.2; 455/455; 455/516

(58) Field of Classification Search
USPC ............ 455/161.1, 150.1, 160.1, 166.2, 455, 455/466, 516, 67.11, 70, 130, 161.2, 161.3, 455/164.1, 165.1, 154.1, 179.1, 230, 231; 375/146, 147, 345, 130; 370/208, 209, 312–314
See application file for complete search history.

(56) References Cited

U.S. PATENT DOCUMENTS

| | | | |
|---|---|---|---|
| 2,292,387 A | 8/1942 | Markey | |
| 4,328,581 A | 5/1982 | Harmon et al. | |
| 4,334,322 A | 6/1982 | Clark, III | |
| 4,337,822 A | 7/1982 | Hyltin et al. | |
| 4,355,399 A | 10/1982 | Timor | |
| 4,554,668 A | 11/1985 | Deman et al. | |
| 4,597,087 A | 6/1986 | Kadin | |
| 4,716,573 A | 12/1987 | Bergstrom et al. | |
| 4,872,182 A | 10/1989 | McRae et al. | |
| 4,914,699 A | 4/1990 | Dunn et al. | |
| 4,937,822 A | 6/1990 | Weddle et al. | |
| 4,977,612 A | 12/1990 | Wilson | |
| 4,998,290 A | 3/1991 | Olenick et al. | |
| 5,079,768 A | 1/1992 | Flammer | |
| 5,179,569 A | 1/1993 | Sawyer | |
| 5,287,384 A | 2/1994 | Avery et al. | |

(Continued)

FOREIGN PATENT DOCUMENTS

| CA | 02252012 | 10/1998 |
|---|---|---|
| DE | 3415032 A1 | 11/1984 |

(Continued)

OTHER PUBLICATIONS

Bluetooth, "Specification of the Bluetooth System", Specification vol. 1, Version 1.1, dated Feb. 22, 2001, 150 pages, (1 of 5).

(Continued)

*Primary Examiner* — Pablo Tran
(74) *Attorney, Agent, or Firm* — Hickman Palermo Truong Becker Bingham Wong LLP; Edward A. Becker

(57) ABSTRACT

An approach and apparatus for adaptive scanning for detection and classification of an RF signal. Time-domain and frequency-domain information are acquired and processed over a broad band of frequencies segmented into channels to produce signal features. The signal features are classified using a signal classifier into signal discriminants, from which a signal of interest is located and identified. Subsequent channel scans then place an increased relative or absolute dwell time on the channel believed to contain the signal of interest.

23 Claims, 8 Drawing Sheets

U.S. PATENT DOCUMENTS

| | | | |
|---|---|---|---|
| 5,323,447 A | 6/1994 | Gillis et al. | |
| 5,337,002 A | 8/1994 | Mercer | |
| 5,361,401 A | 11/1994 | Pirillo | |
| 5,377,221 A | 12/1994 | Munday et al. | |
| 5,377,222 A | 12/1994 | Sanderford, Jr. | |
| 5,394,433 A | 2/1995 | Bantz et al. | |
| 5,418,839 A | 5/1995 | Knuth et al. | |
| 5,448,593 A | 9/1995 | Hill | |
| 5,452,319 A | 9/1995 | Cook et al. | |
| 5,483,557 A | 1/1996 | Webb | |
| 5,515,369 A | 5/1996 | Flammer, III et al. | |
| 5,515,396 A | 5/1996 | Kotzin | |
| 5,541,954 A | 7/1996 | Emi | |
| 5,586,141 A | 12/1996 | Ashdown et al. | |
| 5,666,655 A | 9/1997 | Ishikawa et al. | |
| 5,737,359 A | 4/1998 | Koivu | |
| 5,757,539 A | 5/1998 | Min | |
| 5,809,059 A | 9/1998 | Souissi et al. | |
| 5,848,095 A | 12/1998 | Deutsch | |
| 5,859,662 A * | 1/1999 | Cragun et al. | 725/137 |
| 5,870,391 A | 2/1999 | Nago | |
| 5,887,022 A | 3/1999 | Lee et al. | |
| 5,933,420 A | 8/1999 | Jaszewski et al. | |
| 5,937,002 A | 8/1999 | Anderson et al. | |
| 5,956,642 A | 9/1999 | Larsson et al. | |
| 6,052,594 A | 4/2000 | Chuang et al. | |
| 6,115,407 A | 9/2000 | Gendel et al. | |
| 6,115,408 A | 9/2000 | Gendel et al. | |
| 6,118,805 A | 9/2000 | Bergstrom et al. | |
| 6,122,309 A | 9/2000 | Bergstrom et al. | |
| 6,130,885 A | 10/2000 | Izumi et al. | |
| 6,131,013 A | 10/2000 | Bergstrom et al. | |
| 6,151,352 A | 11/2000 | Taki et al. | |
| 6,195,554 B1 | 2/2001 | H'mimy et al. | |
| 6,212,221 B1 | 4/2001 | Wakayama et al. | |
| 6,212,386 B1 | 4/2001 | Briere et al. | |
| 6,230,026 B1 | 5/2001 | Schwaller et al. | |
| 6,240,125 B1 | 5/2001 | Andersson et al. | |
| 6,249,540 B1 | 6/2001 | Dicker et al. | |
| 6,272,353 B1 | 8/2001 | Dicker et al. | |
| 6,275,518 B1 | 8/2001 | Takahashi et al. | |
| 6,292,494 B1 | 9/2001 | Baker et al. | |
| 6,295,310 B1 | 9/2001 | Yamauchi et al. | |
| 6,298,081 B1 | 10/2001 | Almgren et al. | |
| 6,351,643 B1 | 2/2002 | Haartsen | |
| 6,370,356 B2 | 4/2002 | Duplessis et al. | |
| 6,377,609 B1 | 4/2002 | Brennan, Jr. | |
| 6,389,000 B1 | 5/2002 | Jou | |
| 6,400,751 B1 | 6/2002 | Rodgers | |
| 6,418,317 B1 | 7/2002 | Cuffaro et al. | |
| 6,434,183 B1 | 8/2002 | Kockmann et al. | |
| 6,442,156 B1 | 8/2002 | Carlstrom | |
| 6,466,793 B1 | 10/2002 | Wallstedt et al. | |
| 6,480,721 B1 | 11/2002 | Sydon et al. | |
| 6,487,392 B1 | 11/2002 | Sonetaka | |
| 6,501,785 B1 | 12/2002 | Chang et al. | |
| 6,519,460 B1 | 2/2003 | Haartsen | |
| 6,526,279 B1 | 2/2003 | Dent | |
| 6,574,266 B1 | 6/2003 | Haartsen | |
| 6,577,611 B1 | 6/2003 | Tat et al. | |
| 6,643,278 B1 | 11/2003 | Panasik et al. | |
| 6,647,053 B1 | 11/2003 | Garces | |
| 6,670,920 B1 | 12/2003 | Herrick | |
| 6,694,141 B1 | 2/2004 | Pulkkinen et al. | |
| 6,728,300 B1 * | 4/2004 | Sarkar et al. | 375/147 |
| 6,751,249 B1 | 6/2004 | Cannon et al. | |
| 6,760,319 B1 | 7/2004 | Gerten et al. | |
| 6,807,227 B2 | 10/2004 | Chien | |
| 6,934,315 B2 | 8/2005 | Suwa | |
| 6,954,465 B2 | 10/2005 | Chang et al. | |
| 6,961,363 B1 | 11/2005 | Anvekar et al. | |
| 6,965,590 B1 | 11/2005 | Schmidl et al. | |
| 6,970,495 B1 | 11/2005 | Schmidl et al. | |
| 6,975,603 B1 | 12/2005 | Dicker et al. | |
| 6,975,684 B1 | 12/2005 | Dabak et al. | |
| 6,977,912 B1 | 12/2005 | Porter et al. | |
| 7,006,451 B2 | 2/2006 | Kuwahara | |
| 7,050,402 B2 | 5/2006 | Schmidl et al. | |
| 7,050,479 B1 | 5/2006 | Kim | |
| 7,068,702 B2 | 6/2006 | Chen et al. | |
| 7,079,568 B1 | 7/2006 | Boetzel et al. | |
| 7,103,030 B2 | 9/2006 | Jones | |
| 7,151,767 B2 | 12/2006 | Spencer et al. | |
| 7,158,493 B1 | 1/2007 | Uhlik et al. | |
| 7,280,580 B1 | 10/2007 | Haartsen | |
| 7,321,847 B1 * | 1/2008 | Welkie et al. | 702/199 |
| 7,440,484 B2 | 10/2008 | Schmidl et al. | |
| 7,519,106 B2 * | 4/2009 | Sarkar et al. | 375/146 |
| 7,532,610 B2 | 5/2009 | Batra | |
| 7,620,396 B2 | 11/2009 | Floam et al. | |
| 7,684,465 B1 | 3/2010 | Dabak et al. | |
| 7,952,523 B2 * | 5/2011 | Middour et al. | 342/465 |
| 2002/0122462 A1 | 9/2002 | Batra et al. | |
| 2002/0191678 A1 | 12/2002 | Batra et al. | |
| 2003/0054827 A1 | 3/2003 | Schmidl et al. | |
| 2005/0078225 A1 | 4/2005 | Yen | |
| 2006/0178145 A1 | 8/2006 | Floam et al. | |
| 2007/0032255 A1 * | 2/2007 | Koo et al. | 455/512 |
| 2007/0053410 A1 | 3/2007 | Mahonen et al. | |
| 2010/0184384 A1 * | 7/2010 | Jones et al. | 455/67.11 |
| 2010/0287588 A1 * | 11/2010 | Cox et al. | 725/40 |

FOREIGN PATENT DOCUMENTS

| | | |
|---|---|---|
| EP | 0182762 A | 5/1986 |
| JP | 08-259443 | 9/1996 |
| JP | HEI 10-107693 | 9/1996 |
| JP | 8331012 A | 12/1996 |
| JP | 2002252573 A | 9/2002 |
| WO | WO9848586 A2 | 10/1998 |
| WO | WO 9909671 A | 2/1999 |
| WO | WO01/47308 A1 | 6/2001 |

OTHER PUBLICATIONS

Bluetooth, "Specification of the Bluetooth System", Specification vol. 1, Version 1.1, dated Feb. 22, 2001, 201 pages, (2 of 5).

Bluetooth, "Specification of the Bluetooth System", Specification vol. 1, Version 1.1, dated Feb. 22, 2001, 301 pages, (3 of 5).

Bluetooth, "Specification of the Bluetooth System", Specification vol. 1, Version 1.1, dated Feb. 22, 2001, 301 pages, (4 of 5).

Bluetooth, "Specification of the Bluetooth System", Specification vol. 1, Version 1.1, dated Feb. 22, 2001, 285 pages, (5 of 5).

Bluetooth, "Specification of the Bluetooth System", Specification vol. 1, dated Dec. 1, 1999, 200 pages, (1 of 5).

Bluetooth, "Specification of the Bluetooth System", Specification vol. 1, dated Dec. 1, 1999, 151 pages, (2 of 5).

Bluetooth, "Specification of the Bluetooth System", Specification vol. 1, dated Dec. 1, 1999, 301 pages, (3 of 5).

Bluetooth, "Specification of the Bluetooth System", Specification vol. 1, dated Dec. 1, 1999, 301 pages, (4 of 5).

Bluetooth, "Specification of the Bluetooth System", Specification vol. 1, dated Dec. 1, 1999, 277 pages, (5 of 5).

Bluetooth, "Specification of the Bluetooth System", The ad hoc Scatternet for affordable and highly functional wireless connectivity, Specification vol. 2, 200 pages, dated Jul. 26, 1999, (1 of 2).

Bluetooth, "Specification of the Bluetooth System", The ad hoc Scatternet for affordable and highly functional wireless connectivity, Specification vol. 2, 239 pages, dated Jul. 26, 1999, (2 of 2).

HOMERF, "HomeRF Specification" Revision 2.01, dated Jul. 1, 2002, 200 pages, (1 of 2).

HOMERF, "HomeRF Specification" Revision 2.01, dated Jul. 1, 2002, 327 pages, (2 of 2).

Bluetooth, "Specification of the Bluetooth System", Bluetooth Core Specification Addendum 1, dated Jun. 26, 2008, 75 pages, (1 of 2).

Bluetooth, "Specification of the Bluetooth System", Bluetooth Core Specification Addendum 1, dated Jun. 26, 2008, 99 pages, (2 of 2).

Bluetooth, "Specification of the Bluetooth System", Specification vol. 1, The ad hoc Scatternet for affordable and highly functional wireless connectivity, dated Jul. 26, 1999, 200 pages, (1 of 6).

Bluetooth, "Specification of the Bluetooth System", Specification vol. 1, The ad hoc Scatternet for affordable and highly functional wireless connectivity, dated Jul. 26, 1999, 201 pages, (2 of 6).

Bluetooth, "Specification of the Bluetooth System", Specification vol. 1, The ad hoc Scatternet for affordable and highly functional wireless connectivity, dated Jul. 26, 1999, 201 pages, (3 of 6).
Bluetooth, "Specification of the Bluetooth System", Specification vol. 1, The ad hoc Scatternet for affordable and highly functional wireless connectivity, dated Jul. 26, 1999, 201 pages, (4 of 6).
Bluetooth, "Specification of the Bluetooth System", Specification vol. 1, The ad hoc Scatternet for affordable and highly functional wireless connectivity, dated Jul. 26, 1999, 201 pages, (5 of 6).
Bluetooth, "Specification of the Bluetooth System", Specification vol. 1, The ad hoc Scatternet for affordable and highly functional wireless connectivity, dated Jul. 26, 1999, 263 pages, (6 of 6).
Bluetooth, "Specification of the Bluetooth System", Master Table of Contents & Compliance Requirements, Covered Core Package version: 3.0 + HS, dated Apr. 21, 2000, 150 pages, (1 out of 7).
Bluetooth, "Specification of the Bluetooth System", Master Table of Contents & Compliance Requirements, Covered Core Package version: 3.0 + HS, dated Apr. 21, 2009, 150 pages, (2 out of 7).
Bluetooth, "Specification of the Bluetooth System", Master Table of Contents & Compliance Requirements, Covered Core Package version: 3.0 + HS, dated Apr. 21, 2009, 250 pages, (3 out of 7).
Bluetooth, "Specification of the Bluetooth System", Master Table of Contents & Compliance Requirements, Covered Core Package version: 3.0 + HS, dated Apr. 21, 2009, 250 pages, (4 out of 7).
Bluetooth, "Specification of the Bluetooth System", Master Table of Contents & Compliance Requirements, Covered Core Package version: 3.0 + HS, dated Apr. 21, 2009, 250 pages, (5 out of 7).
Bluetooth, "Specification of the Bluetooth System", Master Table of Contents & Compliance Requirements, Covered Core Package version: 3.0 + HS, dated Apr. 21, 2009, 125 pages, (6 out of 7).
Bluetooth, "Specification of the Bluetooth System", Master Table of Contents & Compliance Requirements, Covered Core Package version: 3.0 + HS, dated Apr. 21, 2009, 125 pages, (7 out of 9).
Bluetooth, "Specification of the Bluetooth System", Master Table of Contents & Compliance Requirements, Covered Core Package version: 3.0 + HS, dated Apr. 21, 2009, 250 pages, (8 out of 9).
Bluetooth, "Specification of the Bluetooth System", Master Table of Contents & Compliance Requirements, Covered Core Package version: 3.0 + HS, dated Apr. 21, 2009, 156 pages, (9 out of 9).
Bluetooth, "Specification of the Bluetooth System", Wireless connections made easy, Master Table of Contents & Compliance Requirements, Covered Core Package version:1.2, dated Nov. 5, 2003, 250 pages (1 out of 5).
Bluetooth, "Specification of the Bluetooth System", Wireless connections made easy, Master Table of Contents & Compliance Requirements, Covered Core Package version:1.2, dated Nov. 5, 2003, 250 pages (2 out of 5).
Bluetooth, "Specification of the Bluetooth System", Wireless connections made easy, Master Table of Contents & Compliance Requirements, Covered Core Package version:1.2, dated Nov. 5, 2003, 250 pages (3 out of 5).
Bluetooth, "Specification of the Bluetooth System", Wireless connections made easy, Master Table of Contents & Compliance Requirements, Covered Core Package version:1.2, dated Nov. 5, 2003, 250 pages (4 out of 5).
Bluetooth, "Specification of the Bluetooth System", Wireless connections made easy, Master Table of Contents & Compliance Requirements, Covered Core Package version:1.2, dated Nov. 5, 2003, 195 pages (5 out of 5).
Bluetooth, "Specification of the Bluetooth System", Wireless connections made easy, Version 1.1, Dated Feb. 22, 2001, 250 pages (1 out of 4).
Bluetooth, "Specification of the Bluetooth System", Wireless connections made easy, Version 1.1, Dated Feb. 22, 2001, 250 pages (2 out of 4).
Bluetooth, "Specification of the Bluetooth System", Wireless connections made easy, Version 1.1, Dated Feb. 22, 2001, 250 pages (3 out of 4).
Bluetooth, "Specification of the Bluetooth System", Wireless connections made easy, Version 1.1, Dated Feb. 22, 2001, 329 pages (4 out of 4).
Bluetooth, "Specification of the Bluetooth System", Wireless Connections made easy, Master Table of Contents & Compliance Requirements, Covered Core Package Version. Dated Nov. 4, 2004, 250 pages (1 out of 5).
Bluetooth, "Specification of the Bluetooth System", Wireless Connections made easy, Master Table of Contents & Compliance Requirements, Covered Core Package Version. Dated Nov. 4, 2004, 250 pages (2 out of 5).
Bluetooth, "Specification of the Bluetooth System", Wireless Connections made easy, Master Table of Contents & Compliance Requirements, Covered Core Package Version. Dated Nov. 4, 2004, 250 pages (3 out of 5).
Bluetooth, "Specification of the Bluetooth System", Wireless Connections made easy, Master Table of Contents & Compliance Requirements, Covered Core Package Version. Dated Nov. 4, 2004, 250 pages (4 out of 5).
Bluetooth, "Specification of the Bluetooth System", Wireless Connections made easy, Master Table of Contents & Compliance Requirements, Covered Core Package Version. Dated Nov. 4, 2004, 226 pages (5 out of 5).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 150, (1 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 142, (2 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 146 pages (3 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 146 pages (4 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 292 pages (5 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2002, 292 pages (6 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (1 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 50 pages (2 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (3 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (4 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 100 pages (5 out of 6).
The Institute of Electrial and Electronics Enginners, Inc., "IEEE Standard for Information technology—Telecommunications and information exchanging between systems—Local and metropolitan area networks—Specific requirements", Part 15.1 Wireless Medium Access Control (MAC) and Physical Layer (PHY) Specifications for Wireless Personal Area Networks (WPANs), dated Jun. 14, 2005, 148 pages (6 out of 6).
Bluetooth, "Specification of the Bluetooth System", Master Table of Contents & Compliance Requirements, Covered Core Package version: 4.0, Dated Jun. 30, 2010, 100 pages (1 out of 23).
Bluetooth, "Specification of the Bluetooth System", Master Table of Contents & Compliance Requirements, Covered Core Package version: 4.0, Dated Jun. 30, 2010, 75 pages (2 out of 23).
Bluetooth, "Specification of the Bluetooth System", Master Table of Contents & Compliance Requirements, Covered Core Package version: 4.0, Dated Jun. 30, 2010, 75 pages (3 out of 23).
Bluetooth, "Specification of the Bluetooth System", Master Table of Contents & Compliance Requirements, Covered Core Package version: 4.0, Dated Jun. 30, 2010, 100 pages (4 out of 23).
Bluetooth, "Specification of the Bluetooth System", Master Table of Contents & Compliance Requirements, Covered Core Package version: 4.0, Dated Jun. 30, 2010, 100 pages (5 out of 23).
Bluetooth, "Specification of the Bluetooth System", Master Table of Contents & Compliance Requirements, Covered Core Package version: 4.0, Dated Jun. 30, 2010, 100 pages (6 out of 23).
Bluetooth, "Specification of the Bluetooth System", Master Table of Contents & Compliance Requirements, Covered Core Package version: 4.0, Dated Jun. 30, 2010, 50 pages (7 out of 23).
Bluetooth, "Specification of the Bluetooth System", Master Table of Contents & Compliance Requirements, Covered Core Package version: 4.0, Dated Jun. 30, 2010, 50 pages (8 out of 23).
Bluetooth, "Specification of the Bluetooth System", Master Table of Contents & Compliance Requirements, Covered Core Package version: 4.0, Dated Jun. 30, 2010, 100 pages (9 out of 23).
Bluetooth, "Specification of the Bluetooth System", Master Table of Contents & Compliance Requirements, Covered Core Package version: 4.0, Dated Jun. 30, 2010, 101 pages (10 out of 23).
Bluetooth, "Specification of the Bluetooth System", Master Table of Contents & Compliance Requirements, Covered Core Package version: 4.0, Dated Jun. 30, 2010, 150 pages (11 out of 23).
Bluetooth, "Specification of the Bluetooth System", Master Table of Contents & Compliance Requirements, Covered Core Package version: 4.0, Dated Jun. 30, 2010, 151 pages (12 out of 23).
Bluetooth, "Specification of the Bluetooth System", Master Table of Contents & Compliance Requirements, Covered Core Package version: 4.0, Dated Jun. 30, 2010, 150 pages (13 out of 23).
Bluetooth, "Specification of the Bluetooth System", Master Table of Contents & Compliance Requirements, Covered Core Package version: 4.0, Dated Jun. 30, 2010, 100 pages (14 out of 23).
Bluetooth, "Specification of the Bluetooth System", Master Table of Contents & Compliance Requirements, Covered Core Package version: 4.0, Dated Jun. 30, 2010, 51 pages (15 out of 23).
Bluetooth, "Specification of the Bluetooth System", Master Table of Contents & Compliance Requirements, Covered Core Package version: 4.0, Dated Jun. 30, 2010, 50 pages (16 out of 23).
Bluetooth, "Specification of the Bluetooth System", Master Table of Contents & Compliance Requirements, Covered Core Package version: 4.0, Dated Jun. 30, 2010, 100 pages (17 out of 23).
Bluetooth, "Specification of the Bluetooth System", Master Table of Contents & Compliance Requirements, Covered Core Package version: 4.0, Dated Jun. 30, 2010, 50 pages (18 out of 23).
Bluetooth, "Specification of the Bluetooth System", Master Table of Contents & Compliance Requirements, Covered Core Package version: 4.0, Dated Jun. 30, 2010, 100 pages (19 out of 23).
Bluetooth, "Specification of the Bluetooth System", Master Table of Contents & Compliance Requirements, Covered Core Package version: 4.0, Dated Jun. 30, 2010, 125 pages (20 out of 23).
Bluetooth, "Specification of the Bluetooth System", Master Table of Contents & Compliance Requirements, Covered Core Package version: 4.0, Dated Jun. 30, 2010, 125 pages (21 out of 23).
Bluetooth, "Specification of the Bluetooth System", Master Table of Contents & Compliance Requirements, Covered Core Package version: 4.0, Dated Jun. 30, 2010, 148 pages (22 out of 23).
Bluetooth, "Specification of the Bluetooth System", Master Table of Contents & Compliance Requirements, Covered Core Package version: 4.0, Dated Jun. 30, 2010, 146 pages (23 out of 23).
Bandspeed Inc., "Adaptive Frequency Hopping, a Non-collaborative Coexistence Mechanism" Project: IEEE P802.15 Working Group for Wireless Personal Area Networks (WPANs), Dated May 16, 2001, 25 pages.
Batra et al., "Proposal for Intelligent BT Frequency Hopping for Enchanced Coexistence", Project: IEEE P802.15 Working Group for Wireless Personal Area Networks (WPANs), Dated Jan. 15, 2001, 13 pages.
Bluetooth, "Bluetooth Technology: The True Hollywood Story", Internet website, http://www.bluetooth.com/English/Press/Pages/PressReleasesDetail.aspx?ID=30, last visited Apr. 13, 2010, 1 page.
Bluetooth, "Bluetooth Specification, 4.5 Payload Format", Version 1.0B, Dated Nov. 29, 1999, 7 pages.
Braun, Hans-Joachin, "Advanced Weaponry of the Starts", American Heritage of Invention & Technology Magazine, vol. 12 No. 4, 1997, 9 pages.
Chen et al., "Selective Hopping for Hit Avoidance", Project: IEEE P802.15 Working Group for Wireless Personal Area Networks (WPANs), Integrated Programmable Communications, Inc., Dated Jan. 15, 2001, 17 pages.
Gan et al., "Adaptive Frequency Hopping Ad-hoc Group Update" Bandspeed Inc., Project: IEEE P802.15 Working Group for Wireless Personal Area Networks (WPANs), Dates May 16, 2001, 14 pages.
Gan et al., "Adaptive Frequency Hopping, Implementation Proposals for IEEE", Bandspeed Ltd., Dated Nov. 2000, 28 pages.
Gan et al., "Adaptive Frequency Hopping, a Non-collaborative Coexistence Mechanism", Project: IEEE P802.15 Working Group for Wireless Personal Area Networks (WPANs), Bandspeed Inc., Dated Mar. 12, 2001, 40 pages.
Gan et al., "Fundamentals of Adaptive Frequency Hopping", Project: IEEE P802.15 Working Group for Wireless Personal Area Networks (WPANs), Bandspeed Inc., Dated Mar. 27, 2001, 4 pages.
Hills, "Terrestrial Wireless Networks", Scientific American Magazine, Dated Apr. 1998, 9 pages.
HOMERF, "Interference Immunity of 2.4 GHz Wireless LANs", Dated Jan. 8, 2001, 10 pages.
HOMERF, "HomeRF Specification HomeRF", Revision 2.01, Dated Jul. 1, 2002, 526 pages.
Hughes et al, "Spread Spectrum Radio", Scientific American Magazine, vol. 278, No. 4, Dated Apr. 1998, 6 pages.
IEEE, "Letter to Coexistence Mechanism Submitters", IEEE P802.15 Working Group for Wireless Personal Area Networks (WPANs), Dated Jan. 29, 2001, 5 pages.
IEEE, "Non-Collaborative AFH Mechanism", IEEE P802.15 Working Group for Wireless Personal Area Networks (WPANs), Dated Jun. 15, 2001, 4 pages.

IEEE, "Adaptive Frequency Hopping Ad-Hoc Group Update", IEEE P802.15 Working Group for Wireless Personal Area Networks (WPANs), Dates May 10, 2001, 15 pages.

Kostic et al., "Dynamic Frequency Hopping in Wireless Cellular Stystems Simulations of Full-Replacement and Reduced-Overhead Methods", Dated 1999, 5 pages.

Sapozhnykov et al., "Adaptive Frequency Hopping—Instant Channel Replacement: Simulation results", Project: IEEE P802.15 Working Group for Wireless Personal Area Networks (WPANs), Dated Oct. 3, 2001, 9 pages.

Bluetooth, "Specification of the Bluetooth System" Specification vol. 1, Dated Dec. 1, 1999, 4 pages.

Wenner, "Hedy Lamarr: Not Just a Pretty Face", Internet website Scientific American, http://www.scientificamerican.com/article.cfm?id=hedy-lamarr-not-just-a-pr, Dated Jun. 3, 2008, 3 pages.

Zander, "Adaptive Frequency Hopping in HF Communications", IEE Proc-Commun., vol. 142, No. 2, Dated Apr. 2, 1995, 99 pages.

United States District Court for the Western District of Texas Austin Division, Joint Invalidity Contentions, *Bandspeed, Inc. vs. Sony Electronics Inc. and Cambridge Silicon Radio Limited*, Civil Action No. A-09-CA-593-LY, 24 pages, dated Jul. 16, 2010.

Defendants Joint Invalidity Contentions, Exhibit A, *Bandspeed, Inc. v. Sony Electronics Inc.*, No. A-09-CA-593-LY, U.S. Patent No. 5,323, 447, Filed Nov. 1, 1991 to Gillis et al., 137 pages.

Defendants Joint Invalidity Contentions, Exhibit A2, *Bandspeed, Inc. v. Sony Electronics Inc.*, No. A-09-CA-593-LY, U.S. Patent No. 5,323, 447, Filed Nov. 1, 1991 to Gillis et al., 70 pages.

Defendants Joint Invalidity Contentions, Exhibit B1, *Bandspeed, Inc. v. Sony Electronics Inc.*, No. A-09-CA-593-LY, U.S. Patent No. 7,440,484 filed Apr. 19, 2001 to Schmidl et al., 79 pages.

Defendants Joint Invalidity Contentions, Exhibit B2, *Bandspeed, Inc. v. Sony Electronics Inc.*, No. A-09-CA-593-LY, U.S. Patent No. 7,440,484 filed Apr. 19, 2001 to Schmidl et al., 67 pages.

Defendants Joint Invalidity Contentions, Exhibit C1, *Bandspeed, Inc. v. Sony Electronics Inc.*, No. A-09-CA-593-LY, U.S. Patent No. 6,272,353 filed Aug. 20, 1999 to Dicker et al.,122 pages.

Defendants Joint Invalidity Contentions, Exhibit C2, *Bandspeed, Inc. v. Sony Electronics Inc.*, No. A-09-CA-593-LY, U.S. Patent No. 6,272,353 filed Aug. 20, 1999 to Dicker et al., 74 pages.

Defendants Joint Invalidity Contentions, Exhibit D1, *Bandspeed, Inc. v. Sony Electronics Inc.*, No. A-09-CA-593-LY, U.S. Patent No. 6,760,319 filed Jul. 5, 2000 to Gerten et al., 72 pages.

Defendants Joint Invalidity Contentions, Exhibit D2, *Bandspeed, Inc. v. Sony Electronics Inc.*, No. A-09-CA-593-LY, U.S. Patent No. 6,760,319 filed Jul. 5, 2000 to Gerten et al., 32 pages.

Defendants Joint Invalidity Contentions, Exhibit E1, *Bandspeed, Inc. v. Sony Electronics Inc.*, No. A-09-CA-593-LY, U.S. Patent No. 6,115,407, filed Apr. 3, 1998 to Gendel et al., 104 pages.

Defendants Joint Invalidity Contentions, Exhibit E2, *Bandspeed, Inc. v. Sony Electronics Inc.*, No. A-09-CA-593-LY, U.S. Patent No. 6,115,407, filed Apr. 3, 1998 to Gendel et al., 68 pages.

Defendants Joint Invalidity Contentions, Exhibit F1, *Bandspeed, Inc. v. Sony Electronics Inc.*, No. A-09-CA-593-LY, U.S. Patent No. 5,937,002 filed Jun. 13, 1995 to Andersson et al., 152 pages.

Defendants Joint Invalidity Contentions, Exhibit F2, *Bandspeed, Inc. v. Sony Electronics Inc.*, No. A-09-CA-593-LY, U.S. Patent No. 5,937,002 filed Jun. 13, 1995 to Andersson et al., 86 pages.

Defendants Joint Invalidity Contentions, Exhibit G1, *Bandspeed, Inc. v. Sony Electronics Inc.*, No. A-09-CA-593-LY, Japanese No. 10-107693, filed Sep. 30, 1996 to Hei, 66 pages.

Defendants Joint Invalidity Contentions, Exhibit G2, *Bandspeed, Inc. v. Sony Electronics Inc.*, No. A-09-CA-593-LY, Japanese No. 10-107693, filed Sep. 30, 1996 to Hei, 34 pages.

Defendants Joint Invalidity Contentions, Exhibit H1, *Bandspeed, Inc. v. Sony Electronics Inc.*, No. A-09-CA-593-LY, U.S. Patent No. 7,050,479, filed May 12, 2000 to Kim, 74 pages.

Defendants Joint Invalidity Contentions, Exhibit H2, *Bandspeed, Inc. v. Sony Electronics Inc.*, No. A-09-CA-593-LY, U.S. Patent No. 7,050,479, filed May 12, 2000 to Kim, 32 pages.

Defendants Joint Invalidity Contentions, Exhibit I1, *Bandspeed, Inc. v. Sony Electronics Inc.*, No. A-09-CA-593-LY, U.S. Patent No. 5,737,359 filed May 10, 1995 to Koivu, 78 pages.

Defendants Joint Invalidity Contentions, Exhibit I2, *Bandspeed, Inc. v. Sony Electronics Inc.*, No. A-09-CA-593-LY, U.S. Patent No. 5,737,359 filed Apr. 7, 1998 to Koivu, 44 pages.

Defendants Joint Invalidity Contentions, Exhibit J1, *Bandspeed, Inc. v. Sony Electronics Inc.*, No. A-09-CA-593-LY, U.S. Patent No. 7,280,580, filed Oct. 15, 1999 to Haartsen, 62 pages.

Defendants Joint Invalidity Contentions, Exhibit J2, *Bandspeed, Inc. v. Sony Electronics Inc.*, No. A-09-CA-593-LY, U.S. Patent No. 7,280,580, filed Oct. 15, 1999 to Haartsen, 26 pages.

Defendants Joint Invalidity Contentions, Exhibit K1, *Bandspeed, Inc. v. Sony Electronics Inc.*, No. A-09-CA-593-LY, U.S. Patent No. 7,079,568 filed May 26, 2000 (priority) to Boetzel et al., 43 pages.

Defendants Joint Invalidity Contentions, Exhibit K2, *Bandspeed, Inc. v. Sony Electronics Inc.*, No. A-09-CA-593-LY, U.S. Patent No. 7,079,568 filed May 26, 2000 (priority) to Boetzel et al., 20 pages.

Defendants Joint Invalidity Contentions, Exhibit L1, *Bandspeed, Inc. v. Sony Electronics Inc.*, No. A-09-CA-593-LY, U.S. Patent No. 4,716,573 filed Nov. 8, 1995 to Bergstrom et al., 42 pages.

Defendants Joint Invalidity Contentions, Exhibit L2, *Bandspeed, Inc. v. Sony Electronics Inc.*, No. A-09-CA-593-LY, U.S. Patent No. 4,716,573 filed Nov. 8, 1995 to Bergstrom et al., 20 pages.

Defendants Joint Invalidity Contentions, Exhibit M, *Bandspeed, Inc. v. Sony Electronics Inc.*, No. A-09-CA-593-LY, U.S. Patent No. 5,848,095 filed May 17, 1996 to Deutsch, 30 pages.

Defendants Joint Invalidity Contentions, Exhibit N, *Bandspeed, Inc. v. Sony Electronics Inc.*, No. A-09-CA-593-LY, Specification of the Bluetooth System, Specification vol. 1.0b, Dec. 1, 1999, 2 pages.

Defendants Joint Invalidity Contentions, Exhibit O, *Banspeed, Inc. v. Sony Electronics Inc.*, No. A-09-CA-593-LY, U.S. Patent No. 6,965,590 filed Jul. 7, 2000 to Schmidl et al., 10 pages.

Defendants Joint Invalidity Contentions, Exhibit P, *Bandspeed, Inc. v. Sony Electronics Inc.*, No. A-09-CA-593-LY, Kistic, et al., "Dynamic Frequency Hopping in Wireless Cellular Systems—Simulations of Full Replacement and Reduced Overhead Methods", IEEE Published May 1999, 12 pages.

Defendants Joint Invalidity Contentions, Exhibit Q, *Bandspeed, Inc. v. Sony Electronics Inc.*, No. A-09-CA-593-LY, U.S. Patent No. 5,956,642 filed Nov. 25, 1996 to Larsson et al., 10 pages.

Defendants Joint Invalidity Contentions, Exhibit R, *Bandspeed, Inc. v. Sony Electronics Inc.*, No. A-09-CA-593-LY, U.S. Patent No. 6,418,317 filed Dec. 1, 1999 to Cuffaro et al, 5 pages.

Defendants Joint Invalidity Contentions, Exhibit S, *Bandspeed, Inc. v. Sony Electronics Inc.*, No. A-09-CA-593-LY, U.S. Patent No. 6,052,594 filed Apr. 30, 1997 to Chuang et al., 4 pages.

Defendants Joint Invalidity Contentions, Exhibit T, *Bandspeed, Inc. v. Sony Electronics Inc.*, No. A-09-CA-593-LY, U.S. Patent No. 6,370,356 filed Oct. 19, 1998 to Duplessis et al., 2 pages.

Defendants Joint Invalidity Contentions, Exhibit U, *Bandspeed, Inc. v. Sony Electronics Inc.*, No. A-09-CA-593-LY, U.S. Patent No. 6,487,392 filed Dec. 6, 1999 to Sonetaka, 6 pages.

Defendants Joint Invalidity Contentions, Exhibit I2, *Bandspeed Inc. v. Acer, Inc. et al.*, 2:10-CV00215, U.S. Patent No. 7,280,580 filed Oct. 15, 1999 to Haartsen compared with U.S. Patent No. 7,027,570,614, 29 pages.

Defendants Joint Invalidity Contentions, Exhibit A1, *Bandspeed, Inc v. Acer, Inc. et al.*, 2:10-CV-00215, Japanese Patent No. 10-107693, filed Sep. 30, 1996 to Hei, compared with U.S. Patent No. 7,027,418, 87 pages.

Defendants Joint Invalidity Contentions, Exhibit A2, *Bandspeed, Inc. v. Acer, Inc. et al.*, 2:10-CV-00215, U.S. Patent No. 6,275,518 compared with U.S. Patent No. 7,570,614, 423 pages.

Defendants Joint Invalidity Contentions, Exhibit A, *Bandspeed, Inc. v. Acer, Inc. et al.*, 2:10-CV-00215, U.S. Patent No. 5,937,002 compared with U.S. Patent No. 7,027,418, 220 pages.

Defendants Joint Invalidity Contentions, Exhibit B, *Bandspeed Inc. v. Acer, Inc. et al.*, 2:10-CV00215, Bark, Power Control in an LPI Adaptive Frequency-Hopping System for the HF Communications compared with U.S. Patent No. 7,027,418, 46 pages.

Defendants Joint Invalidity Contentions, Exhibit B1, *Bandspeed Inc. v. Acer, Inc. et al.*, 2:10-CV00215, U.S. Patent No. 5,737,359, filed May 10, 1995 (Koivu '395) compared with U.S. Patent No. 7,027,418, 122 pages.

Defendants Joint Invalidity Contentions, Exhibit C, *Bandspeed Inc. v. Acer, Inc. et al.*, 2:10-CV00215, U.S. Patent No. U.S. 6,118,805 compared with U.S. Patent No. 7,027,418, 125 pages.

Defendants Joint Invalidity Contentions, Exhibit C1, *Bandspeed Inc. v. Acer, Inc. et al.*, 2:10-CV00215, U.S. Patent No. 7,280,580 filed Oct. 15, 19999 to Hartsen compared with U.S. Patent No. 7, 027,418, 65 pages.

Defendants Joint Invalidity Contentions, Exhibit D, *Bandspeed Inc. v. Acer, Inc. et al.*, 2:10-CV00215, U.S. Patent No. 4,716,573 filed Nov. 8, 1985, to Bergstrom et al. compared with U.S. Patent No. 7,027,418, 87 pages.

Defendants Joint Invalidity Contentions, Exhibit D1, *Bandspeed Inc. v. Acer, Inc. et al.*, 2:10-CV00215, U.S. Patent No. 6, 052,594 filed Apr. 30, 1997 to Chuang et al. (the Chuang '594) compared with U.S. Patent No. 7,027,418, 4 pages.

Defendants Joint Invalidity Contentions, Exhibit D2, *Bandspeed Inc. v. Acer, Inc. et al.*, 2:10-CV00215, U.S. Patent No. 4,937,822 to Weddle et al. compared with U.S. Patent No. 7,570,614, 150 pages.

Defendants Joint Invalidity Contentions, Exhibit E, *Bandspeed Inc. v. Acer, Inc. et al.*, 2:10-CV00215, U.S. Patent No. 7,079,568, filed May 26, 2000 to Boetzel et al. compared with U.S. Patent No. 7,027,418, 56 pages.

Defendants Joint Invalidity Contentions, Exhibit E1, *Bandspeed Inc. v. Acer, Inc. et al.*, 2:10-CV00215, U.S. Patent No. 6,370,356 to ("Duplessis '356") and Canadian Patent Application 2,252,012 to Duplessis et al. ("Duplessis '012") compared with U.S. Patent No. 7,027,418, 3 pages.

Defendants Joint Invalidity Contentions, Exhibit E2, *Bandspeed Inc. v. Acer, Inc. et al.*, 2:10-CV00215, U.S. Patent No. 6,115,407 filed Apr. 3, 1998 to Gendel et al. compared with U.S. Patent No. 7,570,614, 86 pages.

Defendants Joint Invalidity Contentions, Exhibit F, *Bandspeed Inc. v. Acer, Inc. et al.*, 2:10-CV00215, U.S. Patent No. 6,751,249 filed Sep. 24, 1999 to Cannon et al. compared with U.S. Patent No. 7,027,418, 134 pages.

Defendants Joint Invalidity Contentions, Exhibit F1, *Bandspeed Inc. v. Acer, Inc. et al.*, 2:10-CV00215, Cuffaro '317 compared with U.S. Patent No. 7,027,418 ("the '418 patent"), 7 pages.

Defendants Joint Invalidity Contentions, Exhibit F2, *Bandspeed Inc. v. Acer, Inc. et al.*, 2:10-CV00215, Gillis '447 compared with U.S. Patent No. 7,570,614 (the 614 patent), 77 pages.

Defendants Joint Invalidity Contentions, Exhibit G, *Bandspeed Inc. v. Acer, Inc. et al.*, 2:10-CV00215, U.S. Patent No. 6,501,785 filed December with U.S. Patent No. 7,027,418, 165 pages.

Defendants Joint Invalidity Contentions, Exhibit G1, *Bandspeed Inc. v. Acer, Inc. et al.*, 2:10-CV00215, Larsson '642 compared with U.S. Patent No. 7, 027,418 ("the 418 patent"), 11 pages.

Defendants Joint Invalidity Contentions, Exhibit G2, *Bandspeed Inc. v. Acer, Inc. et al.*, 2:10-CV00215, Japanese Patent No. 10-107693, filed Sep. 30, 1996 to Hei compared with U.S. Patent No. 7,570,614, 44 pages.

Defendants Joint Invalidity Contentions, Exhibit H, *Bandspeed Inc. v. Acer, Inc. et al* 2:10-CV00215, U.S. Patent No. 7,684,465 to Dabak et al. compared with U.S. Patent No. 7,027,418, 378 pages.

Defendants Joint Invalidity Contentions, Exhibit H1, *Bandspeed Inc. v. Acer, Inc. et al.*, 2:10-CV00215, U.S. Patent No. 5,937,002 compared with U.S. Patent No. 7,570,614, 96 pages.

Defendants Joint Invalidity Contentions, Exhibit H2, *Bandspeed Inc. v. Acer, Inc. et al.*, 2:10-CV00215, U.S. Patent No. 5.737.359, filed May 10, 1995 ("Koivu '359") compared with U.S. Patent No. 7,570,614, 40 pages.

Defendants Joint Invalidity Contentions, Exhibit I, *Bandspeed Inc. v. Acer, Inc. et al.*, 2:10-CV00215, U.S. Patent No. 6,272,353 filed Aug. 20, 1999 to Dicker et al. compared with U.S. Patent No. 7,027,418, 157 pages.

Defendants Joint Invalidity Contentions, Exhibit J, *Bandspeed Inc. v. Acer, Inc. et al.*, 2:10-CV00215, U.S. Patent No. 6,975,603 filed Aug. 20, 1999 to Dicker et al. compared with U.S. Patent No. 7,027,418, 216 pages.

Defendants Joint Invalidity Contentions, Exhibit J1, *Bandspeed Inc. v. Acer, Inc. et al.*, 2:10-CV00215, U.S. Patent No. US 6,118,805 compared with U.S. Patent No. 7,570,614, 52 pages.

Defendants Joint Invalidity Contentions, Exhibit J2, *Bandspeed Inc. v. Acer, Inc. et al.*, 2:10-CV00215, U.S. Patent No. 6,487,392 compared with U.S. Patent No. 7,570,614, 8 pages.

Defendants Joint Invalidity Contentions, Exhibit K, *Bandspeed Inc. v. Acer, Inc. et al.*, 2:10-CV00215, U.S. Patent No. 6,249,540, filed Jul. 10, 1998 to Dicker et al. compared with U.S. Patent No. 7,027,418, 100 pages.

Defendants Joint Invalidity Contentions, Exhibit K1, *Bandspeed Inc. v. Acer, Inc. et al.*, 2:10-CV00215, U.S. Patent No. 4,716,573 filed Nov. 8, 1985, to Bergstrom et al. compared with U.S. Patent No. 7,570,614, 34 pages.

Defendants Joint Invalidity Contentions, Exhibit K2, *Bandspeed Inc. v. Acer, Inc. et al.*, 2:10-CV00215, U.S. Patent No. 4,937,822 to Weddle et al. compared with U.S. Patent No. 7,027,418, 300 pages.

Defendants Joint Invalidity Contentions, Exhibit L, *Bandspeed Inc. v. Acer, Inc. et al.*, 2:10-CV00215, U.S. Patent No. 6,760,319, filed Jul. 5, 2000 to Gerten et al. compared with U.S. Patent No. 7,027,418, 86 pages.

Defendants Joint Invalidity Contentions, Exhibit L1, *Bandspeed Inc. v. Acer, Inc. et al.*, 2:10-CV00215, U.S. Patent No. 7, 079,568, filed May 26, 2000 to Boetzel et al. compared with U.S. Patent No. 7,570,614, 23 pages.

Defendants Joint Invalidity Contentions, Exhibit M, *Bandspeed Inc. v. Acer, Inc. et al.*, 2:10-CV00215, Y. Kim, et al., "Multi-Adaptive FH Spread Spectrum System for Wireless High Data Rate Multimedia Services," IEEE 2000 compared with U.S. Patent No. 7,027,418, 76 pages.

Defendants Joint Invalidity Contentions, Exhibit M1, *Bandspeed Inc. v. Acer, Inc. et al.*, 2:10-CV00215, U.S. Patent No. 7,684, 465 to Dabak et al. compared with U.S. Patent No. 7,570,614, 176 pages.

Defendants Joint Invalidity Contentions, Exhibit N, *Bandspeed Inc. v. Acer, Inc. et al.*, 2:10-CV00215, U.S. Patent No. 7,050,479 filed May 12, 2000 to Kim compared with U.S. Patent No. 7,027,418, 100 pages.

Defendants Joint Invalidity Contentions, Exhibit N1, *Bandspeed Inc. v. Acer, Inc. et al.*, 2:10-CV00215, U.S. Patent No. 5,848,095 compared with U.S. Patent No. 7,570,614, 45 pages.

Defendants Joint Invalidity Contentions, Exhibit O, *Bandspeed Inc. v. Acer, Inc. et al.*, 2:10-CV00215, Kostic and Maric, Dynamic Frequency Hopping in Wireless Cellular Systems—Simulations of Full Replacement and Reduced-Overhead Models compared with U.S. Patent No. 7,027,418, 44 pages.

Defendants Joint Invalidity Contentions, Exhibit O1, *Bandspeed Inc. v. Acer, Inc. et al.*, 2:10-CV00215, U.S. Patent No. 6, 272,353 filed Aug. 20, 1999 to Dicker et al. compared with U.S. Patent No. 7,570,614, 82 pages.

Defendants Joint Invalidity Contentions, Exhibit P, *Bandspeed Inc. v. Acer, Inc. et al.*, 2:10-CV00215, U.S. Patent Publication No. 2003/0054827, filed Jul. 25, 2001, to Schmidl compared with U.S. Patent No. 7,027,418, 242 pages.

Defendants Joint Invalidity Contentions, Exhibit P1, *Bandspeed Inc. v. Acer, Inc. et al.*, 2:10-CV00215, U.S. Patent No. 6,249,540 filed Jul. 10, 1998 to Dicker et al. compared with U.S. Patent No. 7,570,614, 38 pages.

Defendants Joint Invalidity Contentions, Exhibit Q, *Bandspeed Inc. v. Acer, Inc. et al.*, 2:10-CV00215, U.S. Patent No. 6, 965,590 filed Jul. 7, 2000, to Schmidl et al. compared with U.S. Patent No. 7,027,7418, 107 pages.

Defendants Joint Invalidity Contentions, Exhibit Q1, *Bandspeed Inc. v. Acer, Inc. et al.*, 2:10-CV00215, U.S. Patent No. 6,760,319, filed Jul. 5, 2000 to Gerten et al. compared with U.S. Patent No. 7,570,614, 32 pages.

Defendants Joint Invalidity Contentions, Exhibit R, *Bandspeed Inc. v. Acer, Inc. et al.*, 2:10-CV00215, U.S. Patent No. 7,440,484 filed Apr. 19, 2001 to Schmidl et al., compared with U.S. Patent No. 7,027,418, 120 pages.

Defendants Joint Invalidity Contentions, Exhibit R1, *Bandspeed Inc. v. Acer, Inc. et al.*, 2:10-CV00215, Y. Kim, et al., "Multi-Adaptive FH Spread Spectrum System for Wireless High Data Rate Multimedia Services," IEEE 2000 compared with U.S. Patent No. 7,570,614, 30 pages.

Defendants Joint Invalidity Contentions, Exhibit S, *Bandspeed Inc.* v. *Acer, Inc. et al.*, 2:10-CV00215, PCT Application PCT/IB99/02085 filed Dec. 22, 1999 to Sivakumar compared with U.S. Patent No. 7,027,418, 66 pages.
Defendants Joint Invalidity Contentions, Exhibit S1, *Bandspeed Inc.* v. *Acer, Inc. et al.*, 2:10-CV00215, U.S. Patent No. 7,050,479 filed May 12, 2000 to Kim compared with U.S. Patent No. 7,570,614, 42 pages.
Defendants Joint Invalidity Contentions, Exhibit T, *Bandspeed Inc.* v. *Acer, Inc. et al.*, 2:10-CV00215, Stranneby and Kallquist, Adaptive Frequency Hopping in HF Environments compared with U.S. Patent No. 7,027,418, 45 pages.
Defendants Joint Invalidity Contentions, Exhibit T1, *Bandspeed Inc.* v. *Acer, Inc. et al.*, 2:10-CV00215, Kostic and Maric, Dynamic Frequency Hopping in Wireless Cellular Systems—Simulations of Full-Replacement and Reduced-Overhead Models compared with U.S. Patent No. 7,570,614, 18 pages.
Defendants Joint Invalidity Contentions, Exhibit U, *Bandspeed Inc.* v. *Acer, Inc. et al.*, 2:10-CV00215, U.S. Patent No. 6,480,721 filed Jul. 10, 1998 to Sydon et al. compared with U.S. Patent No. 7,027,418, 97 pages.
Defendants Joint Invalidity Contentions, Exhibit U1, *Bandspeed Inc.* v. *Acer, Inc. et al.*, 2:10-CV00215, U.S. Patent Publication No. 2003/0054827, filed Jul. 25, 2001 to Schmidl compared with U.S. Patent No. 7,570,614, 99 pages.
Defendants Joint Invalidity Contentions, Exhibit V, *Bandspeed Inc.* v. *Acer, Inc. et al.*, 2:10-CV00215, U.S. Patent No. 6,275,518 compared with U.S. Patent No. 7,027418, 910 pages.
Defendants Joint Invalidity Contentions, Exhibit W, *Bandspeed Inc.* v. *Acer, Inc. et al.*, 2:10-CV00215, Specification of the Bluetooth System, Specification vol. 1.0B, Dec. 1, 1999 compared with US. Patent No. 7,027, 7,570,614, 5 pages.
Defendants Joint Invalidity Contentions, Exhibit W1, *Bandspeed Inc.* v. *Acer, Inc. et al.*, 2:10-CV00215, U.S. Patent No. 7,440,484 filed Apr. 19, 2001 to Schmidl et al. compared with U.S. Patent No. 7,570,614, 67 pages.
Defendants Joint Invalidity Contentions, Exhibit X, *Bandspeed Inc.* v. *Acer, Inc. et al.*, 2:10-CV00215, U.S. Patent No. 5,726,978 filed Jun. 22, 1995 to Frodigh, et al. compared with U.S. Patent No. 7,027,418, 104 pages.
Defendants Joint Invalidity Contentions, Exhibit X1, *Bandspeed Inc.* v. *Acer, Inc. et al.*, 2:10-CV00215, PCT Application PCT/IB99/02085 filed Dec. 22, 1999 to Sivakumar compared with U.S. Patent No. 7,570,614, 56 pages.
Defendants Joint Invalidity Contentions, Exhibit Y, *Bandspeed Inc.* v. *Acer, Inc. et al.*, 2:10-CV00215, U.S. Patent No. 6,115,407 filed Apr. 3, 1998 to Gendel et al. compared with U.S. Patent No. 7,027,418, 200 pages.
Defendants Joint Invalidity Contentions, Exhibit Y1, *Bandspeed Inc.* v. *Acer, Inc. et al.*, 2:10-CV00215, Stranneby and Kallquist, Adaptive Frequency Hopping in HF Environments compared with U.S. Patent No. 7,570,614, 19 pages.
Defendants Joint Invalidity Contentions, Exhibit Z, *Bandspeed Inc.* v. *Acer, Inc. et al.*, 2:10-CV00215, Gillis '447 compared with U.S. Patent No. 7,027,418 ("the '418 patent"), 140 pages.
Defendants Joint Invalidity Contentions, Exhibit Z1, *Bandspeed Inc.* v. *Acer, Inc. et al.*, 2:10-CV00215, U.S. Patent No. 6,480,721 filed Jul. 10, 1998 to Sydon et al. compared with U.S. Patent No. 7,570,614, 38 pages.
Doany P. et al. "Theoretical Performance of An Adaptive Frequency-Hopping Modem at HF", IEEE Proceedings, vol. 133, No. 5, Dated Aug. 1986, 6 pages.
Colin et al., "Tradeoffs in Concatenated Coding for Frequency-Hop Packet Radio with Partial-Band Interference", IEEE, dated 1992, 5 pages.
Shellhammer, et al., "Tutorial on 802.15.2 Draft", Dated Mar. 2002, 29 pages.
Google, "John Morten Malerbakken" View Profile, Dated Aug. 15, 2000, 3 pages.
USPTO Patent Full-Text and Image Database, "United States Patent Haartsen", Dated Oct. 9, 2007, 20 pages.

Siemens, "Wholesale Price and Specs for Siemens 2.4GHz Cordless Phones", Http://www/nordsudtt.com/g1054.htm, last accessed May 27, 2011, 8 pages.
Mobilian Corporation, "Wi-Fi (802.11b) and Bluetooth, An Examination of Coexistence Approaches", dated 2001, 25 pages.
Gifford, Ian, "IEEE 802.15.1 TGl Minutes Session #11/Hilton Head Island", IEEE 802.15 Wireless Personal Area Networks, dated Jun. 6, 2001, 13 pages.
Gan Treister, "Clause 14.3 Adaptive Frequency Hopping", IEEEP802.15 Wireless Personal Area Networks, dated Aug. 8, 2001, 25 pages.
Spaozhnykov V. et al., "Convergence of the Instant Channel Replacement Algorithm (ACL+SCO-HV2 Link)", IEEEP802.15 Wireless Personal Area Networks, dated Oct. 2001, 9 pages.
Treister N. et al., "Adaptive Frequency Hopping Classification", IEEEP802.15 Wireless Personal Are Networks, IEEE P802.15 Wireless Personal Area Networks, dated Nov. 8, 2001, 7 pages.
Arunachalam, Arun "Nov. 2001 TG2 minutes", IEEE P802.15 Wireless Personal Area Networks, dated Nov. 2001, 7 pages.
Arunachalam, Arun, "Jan. 2002 TG2 Minutes", IEEE P802.15 Wireless Personal Area Networks, Dated Jan. 2002, 7 pages.
Treister et al., "List of Change Request to 802.15.2 Draft", IEEE P802.15 Wireless Personal Area Networks, Dated Jan. 23, 2002, 4 pages.
Treister et al., "List of Change request to 802.15.2 Draft", IEEE P802.15 Wireless Personal Area Networks, Dated Jan. 23, 2002, 3 pages.
Marquess, Kevin, "TG 2—Coexistence Task Group (Portland Minutes)", IEEE P802.15 Wireless Personal Area Networks, Dated May 2001, 5 pages.
Gan H. et al., "Pseudo-code of new simple Adaptive Frequency Hopping (AFH) approach described in 01/435r0", IEEE P802.15 Wireless Personal Area Networks, Dated Sep. 2001, 4 pages.
Inprocomm et al., "Clause 14.3: Adaptive Frequency Hopping", IEEE P802.15 Wireless Personal Area Networks, Dated Nov. 2001, 13 pages.
Chen et al., "Comparison of TI-IPC's AFH Mechanism and Bandspeed's ICR Proposal", IEEE P802.15 Wireless Personal Area Networks, Dated Oct. 2001, 22 pages.
Spozhnykov et al., "Adaptive Frequency Hopping—Instant Channel Replacement: Simulation results", IEEE P802.15 Wireless Personal Area Networks, dated Oct. 2001, 9 pages.
Treister et al., "Non-Collaborative AFH Mechanism", IEEE P802.15 Wireless Personal Area Networks, Dated Jun. 14, 2001, 4 pages.
Shellhammer, Steve, "Letter to Coexistence Mechanism Submitters", IEEE P802.15 Wireless Personal Area Networks, dated Jan. 30, 2001, 5 pages.
Treister et al., "Adaptive Frequency Hopping ad-hoc group update", IEEE P802.15 Wireless Personal Area Networks, dated May 21, 2001, 15 pages.
The Institute of Electrial and Electronics Enginners, Inc., "Part 15.2 Coexistence of Wireless Personal Area Networks with Others Wireless Devices Operating in Unlicensed Frequency Bands", Dated Aug. 28, 2003, 126 pages.
Kim et al., "Multi-Adaptive FH Spread Spectrum System for Wireless High Data Rate Multimedia Services", IEEE, Dated 2000, 5 pages.
Chen et al. "Multicarrier CDMA with Adaptive Frequency Hopping for Mobile Radio Systems", IEEE Journal on Selected Areas in Communications, vol. 14, No. 9, dated Dec. 1996, 7 pages.
Marquess, Kevin, "TG 2—Coexistence Task Group", IEEE P802.15 Wireless Personal Area Networks, dated Mar. 15, 2001, 5 pages.
The Institute of Electrial and Electronics Enginners, Inc., "Instructions for the WG Chair", dated Mar. 25, 2008, 5 pages.
Wang et al. "Interference Avoidance and Power Control Strategies for Coded Frequency Hopped Cellular Systems", IEEE, dated 1995, 5 pages.
HOMERF, "Interference Immunity of 2.4 GHz Wireless LANs", dated Jan. 2001, 10 pages.
Braun, Hans-Joachim "Advanced Weaponry of the Stars", American Heritage of Invention & Technology, vol. 12, Nov. 4, 9 pages.

Munday, P.J., "Jaguar-V Frequency-hopping radio system", Electronic Counter-Countermeasures, IEEE Proc., vol. 129, dated Jun. 3, 1982, 10 pages.
Symbol Technologies, "Letter to Coexistence Mechanism Submitters", IEEE P802.15 Wireless Personal Area Networks, dated Jan. 2001, 5 pages.
Bandspeed, "Non-Collaborative AFH Mechanism", IEEE P802.15 Wireless Personal Area Networks, dated Jun. 2001, 4 pages.
Kyocera, "Smartphone, Full Qwerty, Flip, Bar, Side Slide Swivel", http://kyocerawireless.com/phones/all.cfm, last accessed May 3, 2011, 3 pages.
The Institute of Electrial and Electronics Enginners, Inc., "Letter of Assurance for Essential Patent Claims", dated Jan. 17, 2008, 4 pages.
Zander J. "LPD Properties of Adaptive Frequency Hopping Systems for HF Communications", HF Radio Systems and Techniques, Jul. 1994, 4 pages.
Anderson, Gunnar, "LPI Performance of an Adaptive Frequency-Hopping System in an HF Interference Environment", Dated 1996, 5 pages.
Bandspeed Inc., "Adaptive Frequency Hopping ad-hoc group update", IEEE P.802.15 Wireless Personal Area Networks, dated May 2001, 15 pages.
Kallquist et al., "Adaptive Frequency Hopping in HF Environments", Minor Topics in Spread Spectrum Communications, Science and Art, dated Aug. 28, 1992, 18 pages.
IEEE P802.15 Personal Area Networks, "Clause 14.3 Adaptive Frequency Hopping", dated Jul. 17, 2001, 26 pages.
IEEE 802.15, "Adaptive Frequency Hopping Implantation Proposals for IEEE 802.15.1/2 WPAN", 28 pages, dated Nov. 2000.
Pursley et al. "A Comparison of Two Methods for Erasure Generation in Frequency-Hop Communications with Partial-Band Interference and Rayleigh Fading", 5 pages, dated 1996.
Correia et al., "Adaptive Frequency-Hopping for TDMA/CDMA with Joint Detection", 5 pages, dated 1998.
Gan et al. "IEEE, Adaptive Frequency Hopping Implementation Proposals for IEEE 802.15 WPAN", 28 pages, dated Nov. 2000.
Zander et al. "Adaptive Frequency Hopping in HF Communications", dated Apr. 1995, 7 pages.
Stranneby et al., "Adaptive Frequency Hopping in HF Environments", dated 1993, 4 pages.
Sabbagh et al. "Adaptive Slow Frequency-Hopping System for Land Mobile Radio", IEE Proceedings vol. 132, Pt. F, No. 5. Dated Aug. 1985, 9 pages.
Young-Hwan et al. "Adaptive Timing Synchronization Schemes For a Short-Ranged Bluetooth Systems", IEEE Transactions on Consumer Electronics, vol. 46, No. 3, Aug. 2000, 7 pages.
MacDonald, "Adjacent-Cell Interference in Direct-Sequence CDMA Forward Traffic Channels", International Journal of Wireless Information Networks, vol. 7, No. 4, 2000, dated 2000, 10 pages.
Jackson et al., "Advanced HF Anti-Jam Network Architecture", dated 1990, 5 pages.
Kim et al., "An Efficient Distributed, Dynamic Traffic Control in a Frequency Hopping CDMA System", IEEE, dated 1992, 5 pages.
Barclay Enterprises Inc., "Siemens Cordless Phone Repair Siemens Cordless Telephone For Sale", http://www.barclayent.com/Cordless/siemenscordless.htm, last accessed May 27, 2011, 6 pages.
Baum et al., "Bayesian Methods for Erasure Insertion in Frequency-Hop Communication Systems with Partial-Band Interference", IEEE Transactions on Communications, vol. 40 No. 7, Jul. 1992, 8 pages.
Bluetooth, "Search for Kyocera Wireless Corp", http://www.bluetooth.com/Pages/Productlisting.aspx?Searchtext+&ProductCategory=08&Manufacture=Kyocera+Wireless+Corp., last accessed Apr. 28, 2011, 2 pages.
Haartsen et al. "Bluetooth A New Radio Interface Providing Ubiquitous Connectivity", IEEE, Dated 2000, 5 pages.
Bluetooth Developers Conference, "Attendance sheet and notes from Conference", www.//webcache.googleusercontent.com/search?...2bandspeed,+Inc.%22+formerly+known+as&ct=clnk (1of 17), last accessed Jan. 24, 2011, 17 pages.
Sizer, Todd, "Bluetooth SIG Coexistence Working Group", Bell Laboratories, IEEE, dated Nov. 2000, 16 pages.
Sizer, Todd, "Blue SIG Coexistence Working Group", Liaison Report, IEEE, dated Jan. 2001, 10 pages.

Bandspeed Inc., "Non-Collaborative AFH Mechanism", IEEE P802.15 Wireless Personal Area Networks, Dated Jul. 7, 2001, 18 pages.
Bandspeed Inc., "Overview of Coexistence Mechanisms", IEEE P802.15 Wireless Personal Area Networks, Dated Jul. 12, 2001, 4 pages.
Chen KC et al., "TG2 Draft Text for Clause14.3 for TG2 Coexixtence Mechanisms", IEEE P802.15 Wireless Personal Area Networks, Dates Jul. 12, 2001, 31 pages.
Chen KC et al., "Clause 14.3 Adaptive Frequency Hopping", IEEE P802.15 Wireless Personal Area Networks, Dated Jul. 12, 2001, 26 pages.
Iwami, Masaaki, "Certified Translation", dates Jun. 25, 2010, 1 page.
Bluetooth, "Technology: The True Hollywood Story", http://bluetooth.com/English/Press/Pages/PressReleasesDetail.aspx?ID=30, last accessed Apr. 13, 2010, 1 page.
Microsoft Press, "Computer Dictionary" Third Edition, Dated 1997, 4 pages.
Cai, Khiem et al., "Continuously Available Net Entry Synchronization Technique", IEEE, Dated 1990, 5 pages.
Bluetooth, "Core Specification Version 1.2", Compliance Requirements, 3 pages.
Yuen et al., "Direct Memory Access Frequency Synthesizer for Channel Efficiency Improvement in Frequency Hopping Communication", IEEE International Symposium on Circuits and Systems, dates May 28-31, 2000, 4 pages.
Kostic et al. "Dynamic Frequency Hopping in Wireless Cellular Systems—Simulations of Full-Replacement and Reduced-Overhead Methods", IEEE, Dated 1999, 5 pages.
Kostic et al., "Dynamic Frequency Hopping In Cellular Systems With Network Assisted Resource Allocation", IEEE, Dated 2000, 5 pages.
Kostic, et al., "Dynamic Frequency Hopping for Limited-Bandwidth Cellular Systems", IEEE, Dated 2000, 8 pages.
Baum et al., "Erasure Insertion in Frequency-Hop Communications with Fading and Partial-Band Interference", IEEE Transactions on Vehicular Technology, vol. 46, No. 4, dated Nov. 1997, 8 pages.
Deb et al., "Error Avoidance in Wireless Networks Using Link State History", IEEE INFOCOM dated 2001, 10 pages.
Internet Archive, Wayback Machine, "Kyocera Cell Phones, Flip Phones", http://replay.web.archive.org/20081217013144/http://tools.kyocera-wireless.com/phoneshowcase.do, last accessed May 3, 2011, 4 pages.
Borth et. al, "Frequency Hopped Systems for PCS", Motorola Inc., 10 pages.
Chayat Naftali, "Frequency Hopping Spread Spectrum PHY of the 802.11 Wireless LAN Standard", doc.:IEEE P802.11-96-49D, dated Mar. 1996, 11 pages.
Anvekar et al., "Frequency Look And Link State History Based Interference Avoidance in Wireless Pico-cellular Networks", IEEE, Dated 2000, 5 pages.
Gigaset, "Gigaset 3000 Comfort, Operating Instruction and Safety Precautions", 27 pages.
Gigaset, "Siemens Gigaset 3000 Classic", dated 2008, 22 pages.
Gigaset, "Quick Start Installation", Gigaset 2402.book Seite iii Dienstag, dated Jul. 6, 1999, 92 pages.
Siemens, "System User Manual, Gigaset 2420", Preliminary Version 3, Dated Jul. 1998, 82 pages.
Internet Machine Wayback Machine, "Take-Your-Entire-CD-Collection-Anywhere Music Player", Hammacher Schlemmer, http://www.hammacher.com./h_and_o/houndex.htm, last accessed May 26, 2011, 4 pages.
Lamarr Hedy, "Not Just A Pretty Face", Scientific American, http://www/scientificamerican.com/article.cfm?id=hedy-lamarr-not-just-a-pr, dated Jun. 3, 2008, 3 pages.
Bluetooth, "Specification of the Bluetooth System" Wireless connections made easy, Host Controller Interface, vol. 4, Dated Jan. 1, 2006, 74 pages.
Stevenson, Carl, "IEEE 802 Wireless Network Standards Development", Joint AHCIET-CITEL Broadband Wireless Access Seminar, Dated Oct. 2003, 23 pages.
IEEE, "IEEE-SA Patent Licensing Policy", IEEE 802.16-01/39, dated Jul. 7, 2001, 5 pages.

Godfrey, Tim, "IEEE P802.11 Wireless LANs", Approved Minutes of the IEEE P802.11 Full Working Group, dated Jan. 2003, 187 pages.
Godfrey, Tim, "IEEE P802.11 Wireless LANs", Approved Minutes of the IEEE P802.11 Full Working Group, dated Nov. 2001, 155 pages.
IEEE, "Submissions", dated Jan. 2001, 4 pages.
Shellhamer, Steve, IEEE 802.15 Task Group (Coxistence):, Dated Mar. 2001, 12 pages.
Trister, Bijan "Adaptive Frequency Hopping ad-hoc group update", IEEEP802.15 Wireless Personal Area Networks, dated Jul. 8, 2010, 15 pages.
Heile, Robert, "IEEE802.15 WG Minutes", IEEEP802.15 Wireless Personal Area Networks, Dated Mar. 27, 2002, 14 pages.
Marquess, Kevin, "TG 2—Coexistence Task Group", IEEE P802.15 Wireless Personal Area Networks, dated May 2001, 6 pages.
Chen et al. "Multi-Carrier DS-CDMA with Adaptive Sub-Carrier Hopping for Fading Channels", IEEE, Dated 1995, 5 pages.
Pursley et al., "Network Protocols for Frequency-Hop Packet Radios with Decoder Side Information", IEEE Journal on Selected Areas in Communications, vol. 12 No. 4, dated May 1994, 10 pages.
Sapozhnykov et al., "Adaptive Frequency Hopping—Instant Channel Replacement: Simulations results", IEEE P802.15 Working Group for Wireless Personal Area Networks (WPANs), dated Oct. 2001, 9 pages.
Pursley, Michael, "Packet Error Probabilities in Frequency-Hop Radio Networks—Coping with Statistical Dependence and Noisy Side Information", IEEE, Dated 1986, 6 pages.
Bark G., "Performance Comparison of Spread-Spectrum Methods on an Interference-Limited HF Channel", IEEE vol. 146 No. 1, dated 1999, 6 pages.
Wong et al., "Performance of Adaptive Frequency Hopping Modem on an HF Link", IEEE Proceedings vol. 137, Pt. 1, No. 6 Dec. 1990, 8 pages.
Andersson, Gunnar, "Performance of Speed-Spectrum Radio Techniques in an Interference-Limited HF Environment", IEEE, dated 1995, 5 pages.
Bark, Gunnar "Power Control and Active Channel Selection in an LPI FH System for HF Communications", Dated 1997, 5 pages.
Bark, G., "Power Control in an LPI Adaptive Frequency-Hopping System for HF Communications", HF Radio Systems and Techniques, Dated Jul. 1997, 5 pages.
Treister et al., "Adaptive Frequency Hopping Ad-hoc group update", Project: IEEE P802.15 Working Group for Wireless Personal Area Networks (WPANs), dated May 2001, 14 pages.
Gan et al., "Merged AFH Proposal", Project: IEEE P802.15 Working Group for Wireless Personal Area Networks (WPANs), dated Aug. 7, 2001, 14 pages.
Bandspeed, "Why Use of Bad Channels Should Be Optional", Project: IEEE P802.15 Working Group for Wireless Personal Area Networks (WPANs), dated Nov. 2001, 6 pages.
Bandspeed, "Why Bad Channels Should be Used in The Adapted Hop Sequence", Project: IEEE P802.15 Working Group for Wireless Personal Area Networks (WPANs),, dated Jun. 24, 2011, 14 pages.
Bandspeed, "Why Use of Bad Channels Should be Optional", Project: IEEE P802.15 Working Group for Wireless Personal Area Networks (WPANs), dated Jun. 24, 2011, 6 pages.
YC Maa et al., "A Wise AFH Solution for WPAN", Project: IEEE P802.15 Working Group for Wireless Personal Area Networks (WPANs), dated Nov. 2001, 32 pages.
Integrated Programmable Communications, Inc, "Request for Clarification of Discrepancies between Doc. 01/435 and TG2-Adopted AFH Mechanism", dated Oct. 2001, 12 pages.
Bandspeed, "Adaptive Frequency Hopping, a Non-collaborative Coexistence Mechanism", Project: IEEE P802.15 Working Group for Wireless Personal Area Networks (WPANs), dated May 2001, 25 pages.
Integrated Programmable Communications, Inc, "Selective Hopping for Hit Avoidance", Project: IEEE P802.15 Working Group for Wireless Personal Area Networks (WPANs), dated Jan. 15, 2001, 17 pages.

Gan et al., "Adaptive Frequency Hopping, a Non-collaborative Coexistence Mechanism", Project: IEEE P802.15 Working Group for Wireless Personal Area Networks (WPANs), Dated Mar. 2001, 40 pages.
Gan et al., "Fundamentals of Adaptive Frequency Hopping", Project : IEEE P802.15 Working Group for Wireless Personal Area Networks (WPANs), Dated Mar. 27, 2001, 4 pages.
Integrated Programmable Communications, Inc., "Merged IPC and TIPC and TI Adaptive Frequency Hopping Proposal", Project:IEEE P802.15 Working Group for Wireless Personal Area Networks (WPANs), Dated May 14, 2001, 47 pages.
Gan et al., "Fundamentals of Adaptive Frequency Hopping", Project: IEEE P802.15 Working Group for Wireless Personal Area Networks (WPANs), Dated Mar. 27, 2001, 4 pages.
Batra et al. "Proposal for Intelligent BF Frequency Hopping for Enhanced Coexistence", Project: IEEE P802.15 Working Group for Wireless Personal Area Networks (WPANs), Dated Jan. 2001, 13 pages.
Gan et al., "Adaptive Frequency Hopping—An instant channel replacement approach", Project: IEEE P802.15 Working Group for Wireless Personal Area Networks (WPANs), dated Sep. 2001, 64 pages.
Siemens, "The Cordless Digital DECT Telephone System Expandable to 6 Handsets", Operating Instructions, dated 1998, 71 pages.
Gan et al., "Adaptive Frequency Hopping—An instant channel replacement approach for both ACL and SCO Links", Project: IEEE P802.15 Working Group for Wireless Personal Area Networks (WPANs), dated Sep. 2001, 21 pages.
Gan et al., "Adaptive Frequency Hopping—An instant channel replacement approach for both ACL and SCO Links", Project: IEEE P802.15 Working Group for Wireless Personal Area Networks (WPANs), Dated Sep. 2001, 23 pages.
Bandspeed, Adaptive Frequency Hopping, a Non-collaborative Coexistence Mechanism, Project: IEEE P802.15 Working Group for Wireless Personal Area Networks (WPANs), Dated May 2001, 25 pages.
Negus et al., "Protocol Packs Wireless Voice, Data", WayBackMachine website, http://web.archive.org/web/19991115145417/http://www.techweb.com/se/directlink.cgi?E, dated Oct. 5, 1998, 3 pages.
Lefriec, Oliver, "Recent Press Releases", Alcated to supply Wireless Local Systems to China, Dated Nov. 25, 1999, 10 pages.
ETSI/PT 12, "Multiplexing and Multiple Access on the Radio Path", GSM Recommendation 05.02, Version 3.8.0, dated Dec. 1995, 37 pages.
ETSI/PT 12, "European Digital Cellular Telecommunication System (phase 1)", Physical Layer on the Radio Path: General Description, ETSI, Dated 1992, 16 pages.
Pursley et al., "Routing in Frequency-Hop Packet Radio Networks with Partial-Band Jamming", IEEE Transactions on Communications, vol. 41 No. 7. Dated Jul. 1993, 8 pages.
Kyocera, "Sanyo Cell Phones, Mobile Phones, Wireless Phones,", Http://kyocerawireless.com/sanyo/usa/all.cfm, dated May 3, 2011, 2 pages.
Hughes et al., "Spread Spectrum Radio", Scientific American, vol. 278, No. 4, Dated Apr. 1998, 6 pages.
Hills Alex, "Terrestrial Wireless Networks", Scientific American, vol. 278, No. 4, dated Apr. 1998, 13 pages.
Siemens, "System User Manual for the Gigaset 2402", Communication Devices, Dated May 1999, 54 pages.
Siemens, "Gigaset2415 Cordless Telephone System with Answering Machine", Owner's Manual, dated 1999, 36 pages.
Siemens, "2415 Answering Machine Quick Reference Guide", 4 pages.
Siemens, "2415 Quick Start Guide", 4 Basic Steps for Getting Started, 6 pages.
Siemens, "Gigaset 2410 Cordless Telephone System with Answering Machine", Owner's Manual, Dated Sep. 1999, 64 pages.
Richardson, "New Cordless Technology Platform Features Multi-user Capabilities, Superior Voice Quality and Highest-level of Integrated Functionally", Siemens Develops Cordless Communication System for U.S. SOHO Market, http://www.thefreelibary.com/

Slemens+Develops+First+Communication+System+for+U.S.+SOHO+... dated, Jul. 13, 1998, 6 pages.

Simens, "Gigaset 2400 Handset and Charger Quick Reference Guide", Dated Jul. 1999, 4 pages.

Siemens ICM, "New Releases", http://web.archive.org/web/20020414121l/http://www.icm.siemens.com/press/2001.html, last accessed May 25, 2011, 16 pages.

Siemens ICM, "New Releases 1998", http://web.archive.org/web/20020414115710/http://icm.siemens.com/press/1998.html, last accessed May 25, 2011, 1 page.

Siemens ICM, "J&R Music World/Computer World Now Offering the First Complete 2.4 GHz Cordless Communication System", http://web.archive,org/web/20020414213336/http://www.icm.siemens.com/press/1998/12_15.html, dated Dec. 15, 1998, 2 pages.

Business Wire, "Siemens New Gigaset 2.4 GHz Cordless Product Provides Unmatched Cordless Capabilities for Growing Multi-cordless Market" http://www/thefreelibrary.com/Siemens+New+Gigaset+2.4.+GHz+Cordless+Product+Provides+Unmatched, Dated Jan. 7, 1999, 5 pages.

Richardson, "Siemens Secures Additional Distributors for its New 2.4 GHz Cordless Communication System", Dated Nov. 18, 1998, 2 pages.

Siemens, "System User Manual for the Gigaset 2420", Siemens Communication Devices, dated Jul. 1999, 100 pages.

Siemens, "Residential Domestic Cordless Phones", dated 2000, 47 pages.

Kyocera, "Kyocera Cell Phones", http://replay.web.archive.org/20060411203708/http://tools.kyocera-wireless.com/phoneshowcase.do, lasted accessed May 3, 2011, 5 pages.

Pottie, Gregory, "Systems Design Choices in Personal Communications", Improving the Capacity of TDMA and CDMA Cellular Radio Systems, IEEE Personal Communications, Dated Oct. 1995, 18 pages.

Brown, Graham, "The Answer to the WLAN vs 36 Argument", Wireless World Forum Posted Thursday Feb. 14, 2002, 8 pages.

Siemens, "The Cordless Digital DECT Telephone System For Up to 6 Handsets with Integrated Answering Machine", Gigaset 2015 Plus, Operating Instructions, dated 1998, 88 pages.

* cited by examiner

ADAPTIVE CHANNEL SCANNING FOR DETECTION AND CLASSIFICATION OF RF SIGNALS

FIELD OF THE INVENTION

This invention relates generally to wireless communications.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

In many wireless communications applications, the available RF band is broken up into channels. For example, the 802.11g band is segmented into 14 channels (depending on the regulatory domain) which, theoretically, allows for at least three, non-overlapping channels of 20 MHz bandwidth, and thus three simultaneous non-interfering wireless links.

To exploit channelization of the band, most RF transceivers are designed for best performance (e.g. noise, linearity, interference rejection) in a single or perhaps a pair of channels. One frequently-used architecture for low-cost RF transceivers is shown in FIG. 1 (receiver only).

This so-called direct conversion receiver has an RF bandwidth that covers multiple channels. In the case of 802.11g, RF bandwidth covers approximately 2.4 GHz to 2.5 GHz. An antenna 102 receives the signal. A front-end bandpass filter (BPF) 104 limits the RF band signal. The band-limited RF signal is amplified by a low-noise amplifier (LNA) 106 prior to a frequency shift to a baseband (BB) frequency using a mixer 110 receiving input from synthesizer 108. The final bandwidth of the receiver is defined by a pair of lowpass filters (BB LPF) 112. The baseband signal is further amplified by a variable-gain amplifier (VGA) 114. Control signals 116 can be applied to one or more of the LNA 106, synthesizer 108, BB LPF 112 and VGA 114 to adjust performance.

For the architecture illustrated in FIG. 1, the receiver's front-end RF bandwidth is set to cover the entire available band, while the BB bandwidth is set to cover (typically) one channel only. In an RF monitoring or scanning scenario, the entire RF bandwidth needs to be analyzed. Consequently, the receiver must scan the channels in some way, dwelling on a channel for some specified amount of time. Typically, the scanning would take place as shown in FIG. 2.

For simplicity, the channels are shown to be disjoint with no gaps between them. Also for simplicity, the time to complete a channel change is assumed to be zero. The dwell time in each channel is the same.

In the channel configuration illustrated in the drawings, five channels are required to cover the RF band. Consequently, when the dwell time in each channel is the same, the duty factor for analysis in each channel is 1/5. Continuous scanning would be accomplished by repeating the channel sequence.

If there is no a priori indication of a signal-of-interest (SOI), specifically no knowledge of what channel in the band that the SOI would be likely to occur, then the scanning shown in FIG. 2 would be adequate.

If a SOI is suspected to occupy one or more channels more frequently than others, then the scanning shown in FIG. 2 could be modified to dwell on the more likely channel(s) for a longer period of time. Dwelling on a more likely channel for a longer period of time provides more opportunities to observe the signal (for example, a pulsed signal) and/or better estimation of signal features due to a longer observation time.

Examples are shown in FIGS. 3 and 4. FIG. 3 shows a scanning protocol that dwells longer on channel C2 and shorter on C3. FIG. 4 shows non-sequential channel scanning in which the scanning sequence is {C0, C1, C0, C2, C4, C3}.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described below.

According to one aspect of the invention, a method for monitoring communications channels comprises: determining performance data for a plurality of communications channels during a first monitoring period, wherein a particular communications channel from the plurality of communications channels is monitored for a first amount of time during the first monitoring period; determining, based upon the performance data, that the particular communications channel includes a signal of interest; in response to determining, based upon the performance data, that the particular communications channel includes the signal of interest, determining a second amount of time for monitoring the particular communications channel, wherein the second amount of time is greater than the first amount of time; and during a second monitoring period that occurs after the first monitoring period, monitoring the particular communications channel for the second amount of time.

Example Architecture

Figure 5:
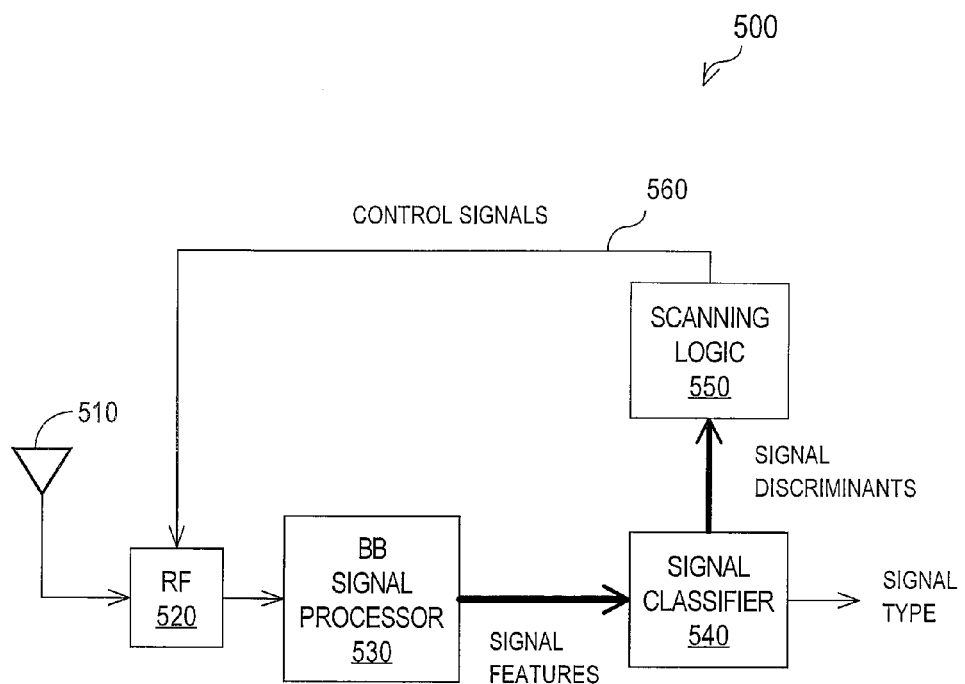
FIG. 5 is a schematic diagram of an embodiment of an adaptive channel scanner.

FIG. 5 is a schematic diagram of an embodiment of adaptive channel scanner 500. An input RF signal is received by antenna 510, and the input signal is converted to a baseband signal by RF module 520. As described below, RF module 520 also receives one or more control signals 560 that control the band frequency and duration of the radio signal collected. The collected signal is further processed in baseband (BB) signal processor 530.

In an embodiment, baseband signal processor 530 digitizes the collected signal. In an embodiment, baseband signal processor 530 performs a fast Fourier transform (FFT) on the collected signal data. In an embodiment, baseband signal processor 530 applies windows to the collected signal data in order to reduce spectral leakage that may occur in an FFT of a sampled finite-duration signal.

In an embodiment, baseband signal processor 530 obtains time-domain signal information that may include one or more of the following features:
(i) duration (such as the length of time a signal is present);
(ii) time-domain power (such as the strength of the signal);
(iii) timestamp (such as the time a particular event occurred);
(iv) correlation (such as a similarity measure of the signal to either another measured signal or a signal model);
(v) pulse-repetition interval (PRI) (such as the period between pulse repetitions in a multi-pulse signal); and
(vi) pulse count (such as the number of pulses in a burst of a multi-pulse signal).

In an embodiment, baseband signal processor 530 obtains frequency-domain signal information that may include or more of the following features:
(i) bandwidth (such as the frequency-span occupied by the signal, and analogous to duration in the time-domain);
(ii) center frequency (such as the frequency occupied by the signal such that equal bandwidth lies on each side);
(iii) peak magnitude frequency (such as the frequency corresponding to the peak signal power or power spectral density (PSD) or collected energy); and
(iv) power spectral density (PSD) (such as the power at each frequency per unit of frequency, in units of power per bandwidth, e.g. dBm/MHz).

The quantities described above are merely illustrative, with variations possible depending on the type of information desired. For example, a measure of the center frequency could incorporate statistical definitions such as mean, median, or mode.

After processing by baseband signal processor 530, the resulting signal features are passed to signal classifier 540 for classification. Example classification methods that may be performed by signal classifier 540 are further described below with respect to FIGS. 6-8.

Signal discriminants output by signal classifier 540 are received by scanning logic 550. In an embodiment, signal type information is also displayed to a user or processed by other logic (not shown in FIG. 5). The scanning logic 550, also further described below, generates and sends control signals 560 back to RF module 520, forming a control loop and resulting in an adaptive channel scanner.

Example Process Flows

The following processes can be implemented in hardware, software, or any combination of hardware and software. For example, theses processes could be implemented in an ASIC. However, at least some of the blocks in these processes could be implemented by executing instructions on a processor. These blocks in the following processes are discussed in a particular order as a matter of convenience to facilitate explanation. The processes are not limited to the order in which the blocks are discussed or depicted in the figures.

Figure 6:
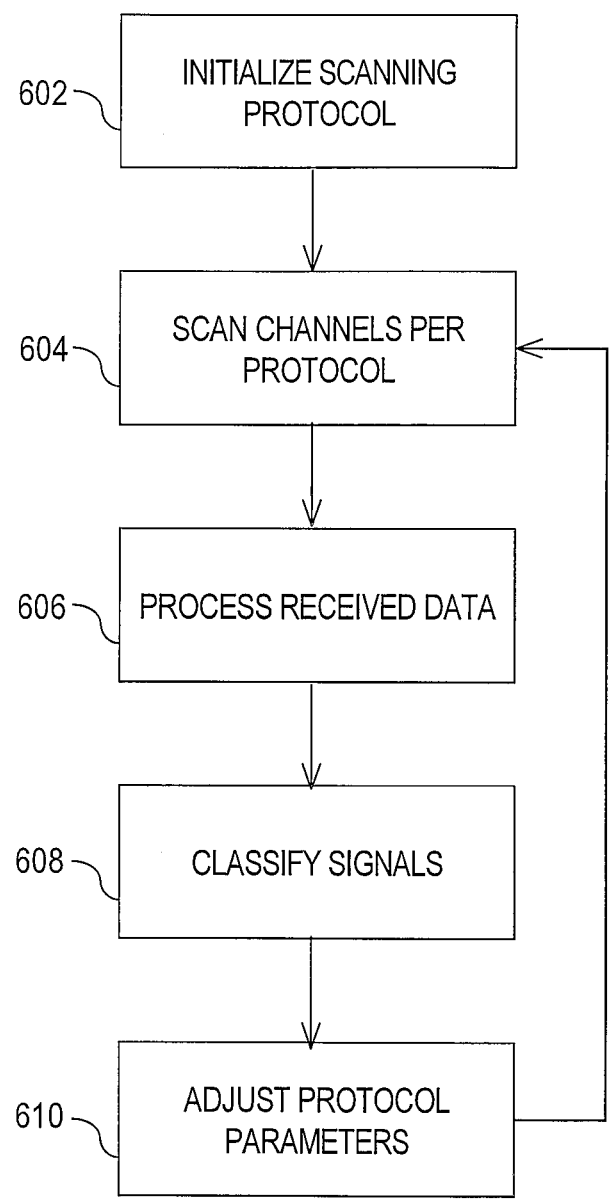
FIG. 6 is an example process flow of the steps performed by the adaptive channel scanner using an adaptive scanning protocol.

FIG. 6 is an example process flow of steps performed by the adaptive channel scanner using an adaptive scanning protocol. While this non-limiting, illustrative example of the adaptive scanning protocol primarily will focus on the two parameters of dwell time and scanning order, the adaptive scanning protocol should not be considered as limited to these two parameters. For example, the protocol could additionally include parameters representing the size of the RF band and the segmentation of the bandwidth into channels.

Figure 1:
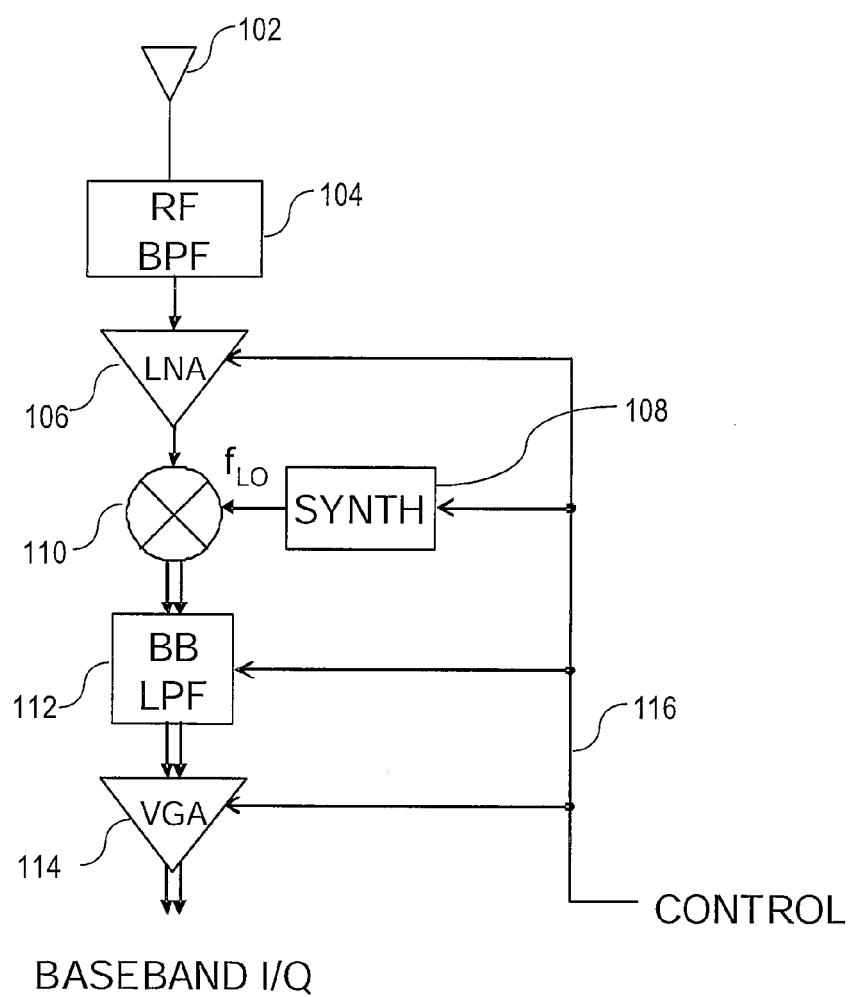
FIG. 1 is a schematic diagram of a direct-conversion RF receiver.
Figure 2:
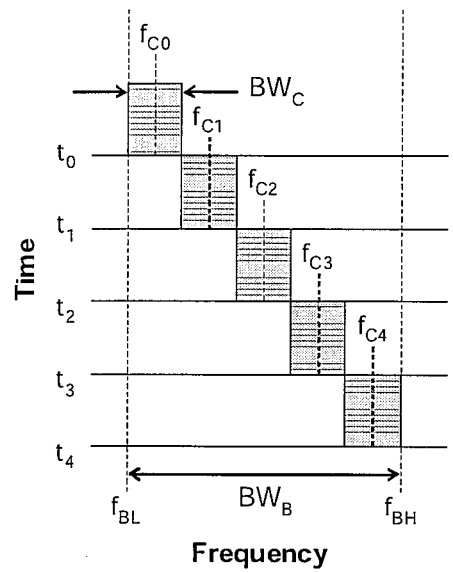
FIG. 2 is an illustration of synchronous, sequential scanning of a frequency bandwidth separated into channels.
Figure 3:
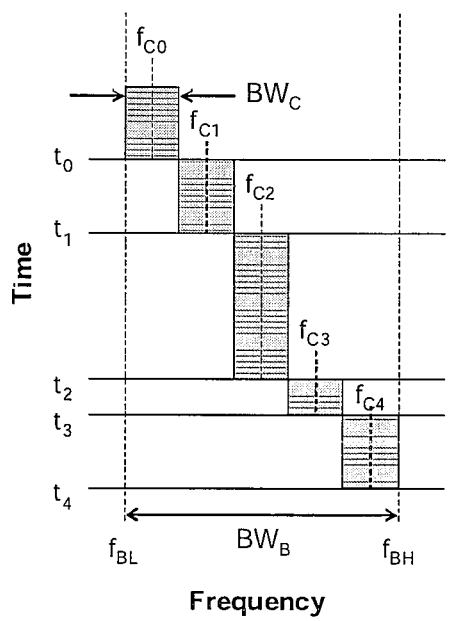
FIG. 3 is an illustration of asynchronous scanning for an arbitrary scanning protocol for the channels shown in FIG. 2.
Figure 4:
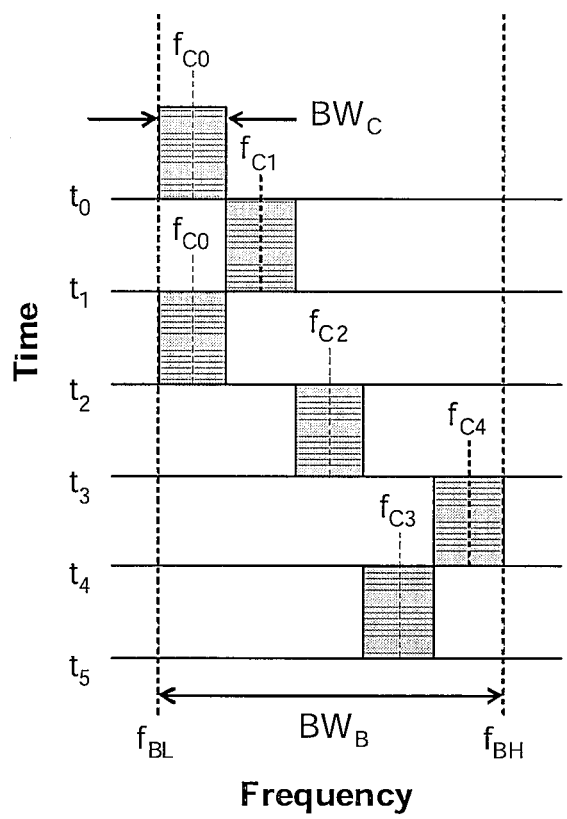
FIG. 4 is an illustration of non-sequential scanning protocol for the channels shown in FIG. 2.

In step 602 of FIG. 6, the scanning protocol is initialized. In this non-limiting example, the RF band and channels are fixed, and dwell time and scanning order may vary. Absent prior knowledge regarding the location of a SOI, a reasonable initial scanning protocol would be that illustrated in FIG. 2, in which five non-overlapping channels {C0, C1, C2, C3, C4} are scanned in sequential order with each channel scan time of an equal duration of time T. Then, in this example, a complete scan of all channels as determined by the initial scanning protocol would take a total time of 5T.

In step 604, channels are scanned according to the determined scanning protocol, resulting in a set of sampled data. While this illustration presupposes a fixed data sampling rate, the data sampling rate could be incorporated into the scanning protocol as a parameter that could be varied. For example, it could be determined that a lack of an identified SOI may be caused in part by a data sampling rate that is too low, and thus the data sampling rate could be increased for future scans. Similarly, a data sampling rate may be lowered in certain situations, leading to a decrease in processing time.

In step 606, the received signal data is processed. As previously explained with regard to baseband signal processor 530, several filtering and signal processing techniques may be applied to the signal data to obtain time-domain and frequency-domain information.

Figure 7:
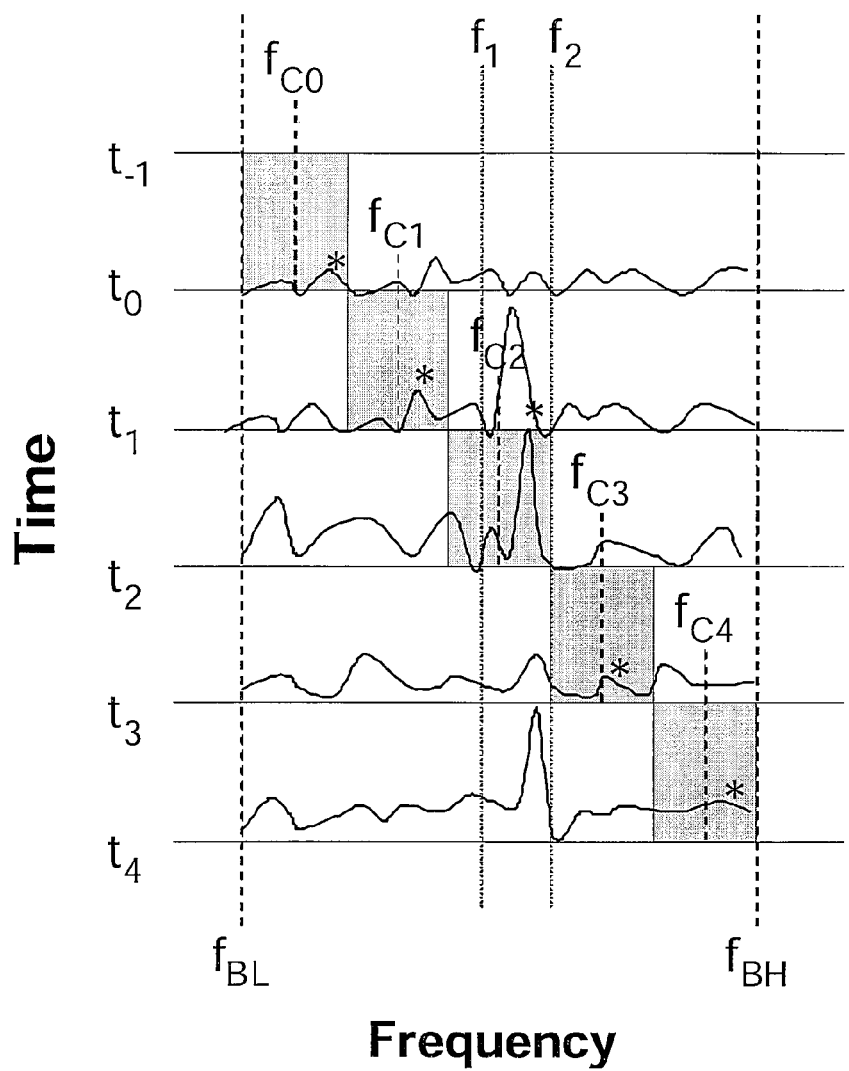
FIG. 7 is an illustration of power spectra over a frequency range at times $\{t_0, t_1, t_2, t_3, t_4\}$ in which sample data is taken over the channel and time period corresponding to the shaded area of each spectra, and using a sequential scanning protocol.

In step 608, the calculated time-domain and frequency-domain information is used to form signal discriminants used to identify a SOI. FIG. 7 is an illustration of power spectra over a frequency range at times $\{t_0, t_1, t_2, t_3, t_4\}$ in which sample data is taken over the channel and time period corresponding to the shaded area of each spectra, and a sequential scanning protocol is used.

FIG. 7 displays the power spectrum for the frequency band beginning at frequency $f_{BL}$ and ending at $f_{BH}$ for the signal as of sampling time beginning at time equals $t_{-1}$ and lasting through time equals $t_4$. For the illustrated example, a pulsed, continuous-wave SOI that lies between frequencies $f_1$ and $f_2$ is used as input.

Each shaded region of the plots shown on FIG. 7 corresponds to the channel scanned starting at each respective sampling time; for example, channel C0 (having center frequency $f_{C0}$) is scanned during the time interval $(t_{-1}, t_0)$, with the resulting power spectrum displayed along the frequency axis in FIG. 7 for time equal to. The next scanned channel is channel C1 (having center frequency $f_{C1}$) during the time interval $(t_0, t_1)$ with the resulting power spectrum displayed along the frequency axis in FIG. 7 for time equal to $t_1$. As shown by arrangement of shaded regions having approximately equal areas, the scanning protocol corresponds to a synchronous sequential scan.

For this non-limiting, illustrated example, the selected signal discriminant is the frequency and bandwidth where the peak value occurs in the channel. For each shaded region of FIG. 7 corresponding to a scanned channel, the approximate peak value is denoted by an asterisk "*."

Thus, for the combination of the: (1) scanning protocol illustrated in FIG. 7, (2) signal data illustrated in FIG. 7, and (3) selected signal discriminant, the FFT at time $t_2$ of channel C2 captures the SOI.

In the example shown above, the selection of the SOI can be made by relative comparison of all possible candidates, with the selected SOI corresponding to the candidate whose value lies furthest from the average of samples. Such a selection method could obtain accurate and quick results in a situation in which (1) the noise floor for all channels is low, (2) no channels suffer from interference, (3) the true SOI fails to satisfy comparison tests with respect to actual values, but (4) the true SOI stands out relative to the other candidates.

In an embodiment, the selection of the SOI can be made by comparison of all possible candidates to values predicted by a model. In an embodiment, the selection of the SOI can be made using maximum likelihood estimation techniques.

In an embodiment, the selection of the SOI can be made by comparison of all possible candidates to values supplied as input. The selection of the SOI can itself be adaptive, using a neural network or another adaptive or trainable algorithm trained with data taken from known signal type and discriminant combinations.

With reference back to step 610 of FIG. 6, the protocol parameters are adjusted so that next scanning sequence will sample more data measured in channel C2, to better extract features of the SOI. With the protocol parameters thus updated, the procedure returns to the channel scan of step 604.

In an embodiment, the dwell time is increased on the channel believed to contain the SOI. In an alternative embodiment, the dwell time for each channel is held constant while multiple visits of the channel believed to contain the SOI are made during a full scanning cycle. In an alternative embodiment, the duration of the complete scanning cycle is fixed, and each channel not believed to contain the SOI remains in the scanning cycle, but is allocated a shortened dwell time, while the channel believed to contain the SOI is allocated an increased dwell time.

Figure 8:
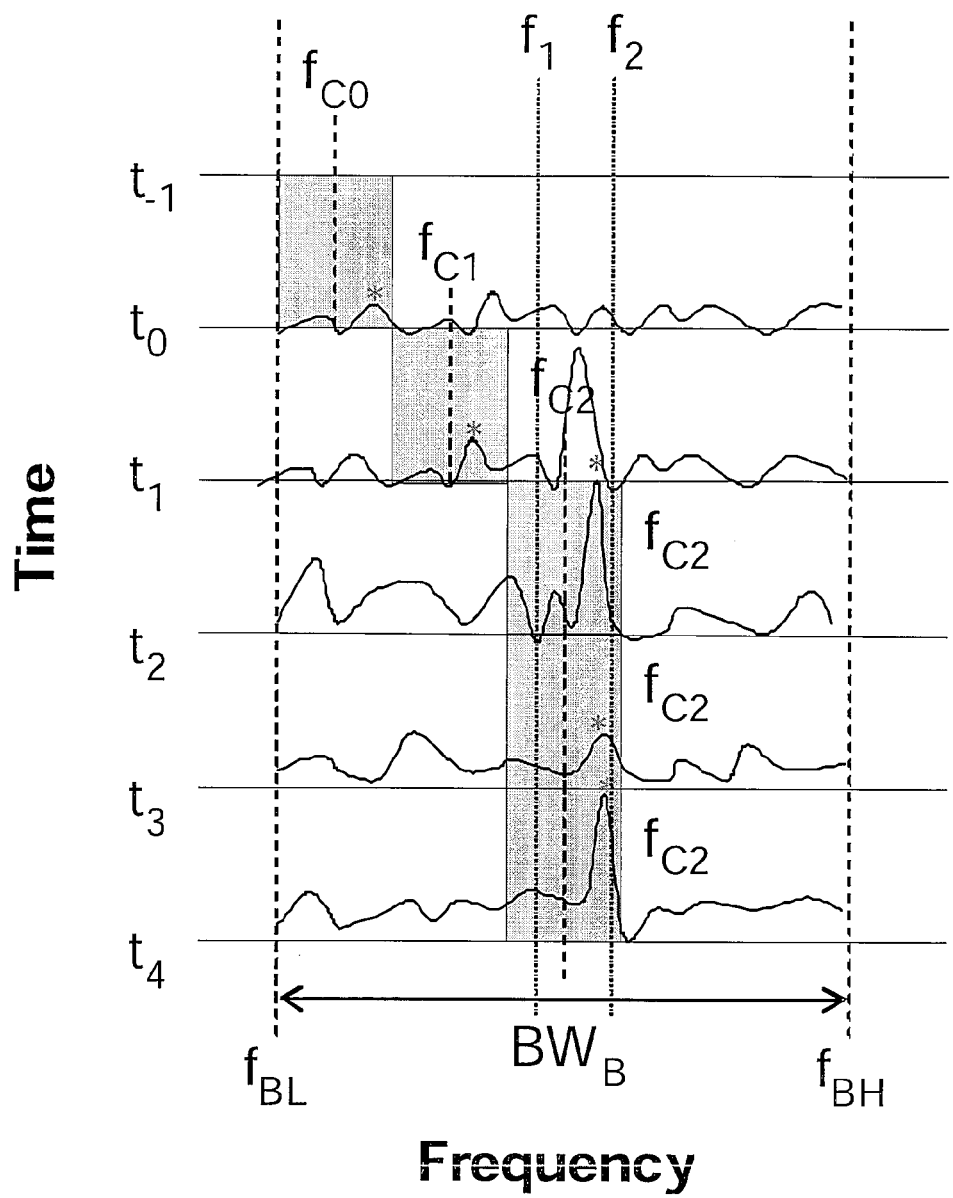
FIG. 8 is an illustration of power spectra over a frequency range at times $\{t_0, t_1, t_2, t_3, t_4\}$ in which sample data is taken over the channel and time period corresponding to the shaded area of each spectra, and using an adaptive scanning protocol.

FIG. 8 illustrates the results in which the scanning protocol parameters are changed to collect more data in the channel C2, the channel believed to contain the SOI. In this example, the scanning protocol is changed to triple the dwell time on channel C2 by deleting scans on channels C3 and C4. By so doing, the adaptive scanning protocol is able to quickly and efficiently acquire more data related to the SOI, and then re-adapt should the signal change.

Although not illustrated, the adaptive channel scanner and method may be used to locate an SOI which itself follows an arbitrary hopping sequence, such as a pseudo-random hopping sequence used as part of a transmission made using the Bluetooth standard. Such a protocol likely would not be sequential, and may not be synchronous should a transmission remain on.

Although not illustrated, the adaptive channel scanner and method may be used to locate multiple signals of interest, in which each SOI is distinguishable by one or more signature characteristics such as peak magnitude frequency power, pulse-repetition interval, or any combination of information produced by baseband signal processor 530. For example, in an environment containing two radar signals, with one radar signal located closer to the adaptive channel scanner than the second radar signal, the adaptive channel scanner could differentiate between the two signals via a combination of differing pulse-repetition intervals and power-spectral densities, even if the radars operated on a common frequency.

Implementation Mechanisms

The approach for monitoring communications channels described herein may be implemented in a variety of ways and the invention is not limited to any particular implementation. The approach may be integrated into a wireless communications system or a wireless device, or may be implemented as a stand-alone mechanism. Furthermore, the approach may be implemented in computer software, hardware, or a combination thereof.

Figure 9:
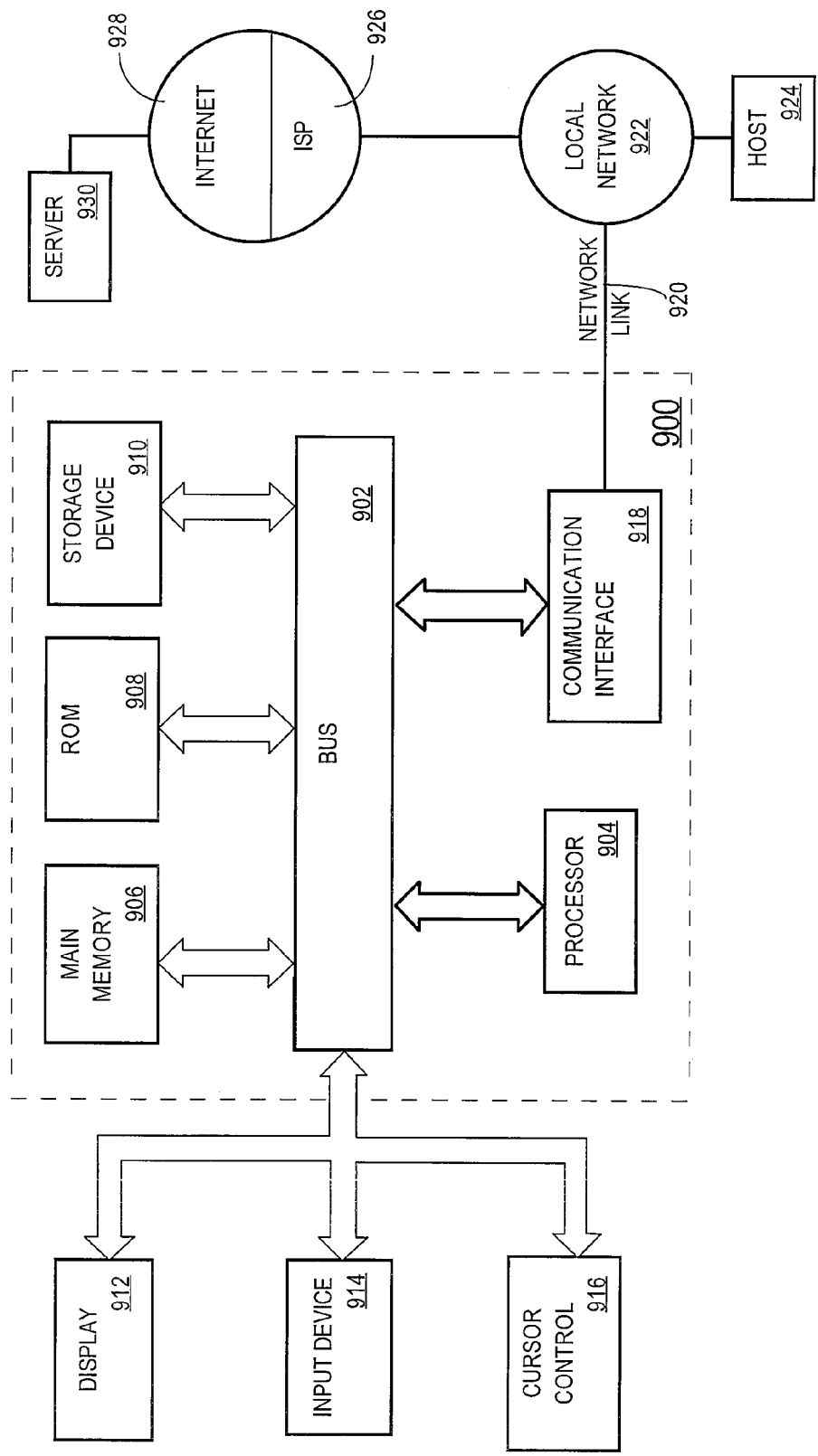
FIG. 9 is a block diagram that illustrates a computer system upon which an embodiment of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to storage media and transmission media. Storage media includes both non-volatile media and volatile media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for monitoring communications channels, the computer-implemented method comprising:

determining performance data for a plurality of communications channels during a first monitoring period, wherein a particular communications channel from the plurality of communications channels is monitored for a first amount of time during the first monitoring period;

determining, based upon the performance data, that the particular communications channel includes a signal of interest;

in response to determining, based upon the performance data, that the particular communications channel includes the signal of interest, determining a second amount of time for monitoring the particular communications channel, wherein the second amount of time is greater than the first amount of time; and during a second monitoring period that occurs after the first monitoring period, monitoring the particular communications channel for the second amount of time.

2. The computer-implemented method of claim 1, wherein each monitoring period corresponds to the total amount of time in which all channels selected to be monitored are monitored in a selected sequence.

3. The computer-implemented method of claim 2, further comprising determining, based upon the performance data, the duration of the second monitoring period.

4. The computer-implemented method of claim 3, further comprising determining, based upon the performance data, the selected sequence of monitoring channels during the second monitoring period.

5. The computer-implemented method of claim 1, wherein the determining based upon the performance data, that the particular communications channel includes a signal of interest includes performing one or more fast Fourier transformations upon the performance data.

6. The computer-implemented method of claim 1, further comprising determining, based upon the performance data, a classification of the signal of interest.

7. The computer-implemented method of claim 6, wherein the classification of the signal of interest is based upon one or more of the following types of performance data: duration, time-domain power, timestamp, correlation, pulse-repetition interval, pulse count, bandwidth, center frequency, peak magnitude frequency, or power spectral density.

8. The computer-implemented method of claim 1, wherein the second amount of time comprises at least two non-contiguous time intervals during the second monitoring period.

9. The computer-implemented method of claim 1, wherein the second monitoring period is longer than the first monitoring period.

10. An adaptive channel scanner, comprising:
an RF module, wherein the RF module receives an input RF signal and one or more control signals, and wherein under direction of the one or more control signals, the RF module converts the input RF signal to channel data for a plurality of communications channels;
a signal processor that processes the channel data and determines performance data including signal features;
a signal classifier that receives the signal features and determines one or more signal discriminants from the signal features;
a logic module that receives the signal discriminants, wherein the logic module determines a signal of interest, and wherein the logic module additionally determines the one or more control signals used to control the RF module;
wherein the one or more control signals direct the RF module to monitor channel data from a particular communications channel from the plurality of communications channels for a first amount of time during a first monitoring period; and
wherein the logic module determines the signal of interest lies in the particular communications channel, and sends one or more updated control signals to the RF module to monitor the particular communications channel for a second amount of time during a second monitoring period, wherein the second amount of time is greater than the first amount of time.

11. The adaptive channel scanner of claim 10, wherein the logic module determines a sequence of monitoring communications channels to be performed by the RF module during the second monitoring period.

12. The adaptive channel scanner of claim 10, wherein the second amount of time comprises at least two non-contiguous time intervals during the second monitoring period.

13. The adaptive channel scanner of claim 10, wherein the signal processor performs one or more fast Fourier transformations.

14. The adaptive channel scanner of claim 10, wherein the signal discriminants are based upon one or more of the following types of performance data: duration, time-domain power, timestamp, correlation, pulse-repetition interval, pulse count, bandwidth, center frequency, peak magnitude frequency, or power spectral density.

15. A non-transitory computer-readable medium for monitoring communications channels, the non-transitory computer-readable medium storing instructions which, when processed by one or more processors, causes:
determining performance data for a plurality of communications channels during a first monitoring period, wherein a particular communications channel from the plurality of communications channels is monitored for a first amount of time during the first monitoring period;
determining, based upon the performance data, that the particular communications channel includes a signal of interest;
in response to determining, based upon the performance data, that the particular communications channel includes the signal of interest, determining a second amount of time for monitoring the particular communications channel, wherein the second amount of time is greater than the first amount of time; and
during a second monitoring period that occurs after the first monitoring period, monitoring the particular communications channel for the second amount of time.

16. The non-transitory computer-readable medium of claim 15, wherein each monitoring period corresponds to the total amount of time in which all channels selected to be monitored are monitored in a selected sequence.

17. The non-transitory computer-readable medium of claim 16, further comprising determining, based upon the performance data, the duration of the second monitoring period.

18. The non-transitory computer-readable medium of claim 17, further comprising determining, based upon the performance data, the selected sequence of monitoring channels during the second monitoring period.

19. The non-transitory computer-readable medium of claim 15, wherein the determining based upon the performance data, that the particular communications channel includes a signal of interest includes performing one or more fast Fourier transformations upon the performance data.

20. The non-transitory computer-readable medium of claim 15, further comprising determining, based upon the performance data, a classification of the signal of interest.

21. The non-transitory computer-readable medium of claim 20, wherein the classification of the signal of interest is based upon one or more of the following types of performance data: duration, time-domain power, timestamp, correlation, pulse-repetition interval, pulse count, bandwidth, center frequency, peak magnitude frequency, or power spectral density.

22. The non-transitory computer-readable medium of claim 15, wherein the second amount of time comprises at least two non-contiguous time intervals during the second monitoring period.

23. The non-transitory computer-readable medium of claim 15, wherein the second monitoring period is longer than the first monitoring period.

* * * * *